(12) United States Patent  
Castillo

(10) Patent No.: US 10,408,429 B2
(45) Date of Patent: Sep. 10, 2019

(54) LENS FOR PREFERENTIAL-SIDE DISTRIBUTION

(75) Inventor: Mario Alberto Castillo, Racine, WI (US)

(73) Assignee: IDEAL Industries Lighting LLC, Sycamore, IL (US)

( * ) Notice: Subject to any disclaimer, the term of this patent is extended or adjusted under 35 U.S.C. 154(b) by 679 days.

(21) Appl. No.: 13/466,076

(22) Filed: May 7, 2012

(65) Prior Publication Data

US 2013/0223062 A1 Aug. 29, 2013

Related U.S. Application Data

(63) Continuation-in-part of application No. 13/408,882, filed on Feb. 29, 2012, now Pat. No. 9,541,257.

(51) Int. Cl.
| | |
|---|---|
| *F21V 13/04* | (2006.01) |
| *G02B 19/00* | (2006.01) |
| *F21V 5/04* | (2006.01) |
| *F21V 7/00* | (2006.01) |
| *F21Y 115/10* | (2016.01) |

(52) U.S. Cl.
CPC ............. *F21V 13/04* (2013.01); *F21V 5/04* (2013.01); *G02B 19/0014* (2013.01); *G02B 19/0061* (2013.01); *F21V 7/00* (2013.01); *F21Y 2115/10* (2016.08)

(58) Field of Classification Search
CPC .............. F21V 5/08; F21S 8/088; F21S 8/086
USPC ................................................ 362/309, 153.1
See application file for complete search history.

(56) References Cited

U.S. PATENT DOCUMENTS

| | | |
|---|---|---|
| 1,404,004 A | 1/1922 | Benford |
| 1,535,486 A | 4/1925 | Lundy |
| 2,007,033 A | 7/1935 | Williams |
| 2,212,876 A | 8/1940 | Chauvet |
| 2,254,961 A | 9/1941 | Harris |
| 2,356,654 A | 8/1944 | Cullman |
| 2,802,097 A | 9/1952 | Franck |
| 2,908,197 A | 10/1959 | Wells et al. |
| 3,497,687 A | 2/1970 | Hermann |

(Continued)

FOREIGN PATENT DOCUMENTS

| | | |
|---|---|---|
| EP | 1107210 A2 | 6/2001 |
| GB | 2282700 | 4/1995 |

(Continued)

OTHER PUBLICATIONS

Future Lighting Solutions "the 6 Steps to LED Lighting Success" brochure. Date: undated. 6 pages.

*Primary Examiner* — Sharon E Payne
(74) *Attorney, Agent, or Firm* — Jansson Munger McKinley & Kirby Ltd.

(57) ABSTRACT

A lens for distribution of light from a light emitter having an axis, the lens including a (1) base forming a substantially rectangular opening to an emitter cavity defined by an inner surface, (2) a main output surface transverse the axis, (3) a reflecting surface positioned to reflect light received from the inner surface toward the main output surface, the reflecting surface including front and back curvatures and a pair of substantially-identical lateral curvatures each adjoining the front and back curvatures. Configuration of the lateral curvatures differs from configurations of the front and back curvatures, which differ from one another.

43 Claims, 18 Drawing Sheets

(56) References Cited

U.S. PATENT DOCUMENTS

| | | | |
|---|---|---|---|
| 3,625,615 A | 12/1971 | Wilson | |
| 4,186,995 A | 2/1980 | Schumacher | |
| 4,254,453 A | 3/1981 | Mouyard et al. | |
| 4,336,580 A | 6/1982 | Mouyard et al. | |
| 4,345,308 A | 8/1982 | Mouyard et al. | |
| 4,650,998 A | 3/1987 | Martin | |
| 4,767,172 A | 8/1988 | Nichols et al. | |
| 4,845,600 A | 7/1989 | Matsumura et al. | |
| 4,862,330 A | 8/1989 | Machida et al. | |
| 4,935,665 A | 6/1990 | Murata | |
| 4,941,072 A | 7/1990 | Yasumoto et al. | |
| 5,001,609 A | 3/1991 | Gardner et al. | |
| 5,013,144 A | 5/1991 | Silverglate et al. | |
| 5,014,165 A | 5/1991 | Naganawa | |
| 5,062,027 A | 10/1991 | Machida et al. | |
| 5,127,728 A | 7/1992 | Warren et al. | |
| 5,140,220 A | 8/1992 | Hasegawa | |
| 5,174,649 A | 12/1992 | Alston | |
| RE34,254 E | 5/1993 | Dragoon | |
| 5,289,082 A | 2/1994 | Komoto | |
| 5,302,778 A | 4/1994 | Maurinus | |
| 5,349,504 A | 9/1994 | Simms et al. | |
| 5,592,578 A | 1/1997 | Ruh | |
| 5,784,209 A | 7/1998 | Manabe | |
| 5,813,743 A | 9/1998 | Naka | |
| 5,813,752 A | 9/1998 | Singer et al. | |
| 5,865,529 A | 2/1999 | Yan | |
| 5,894,195 A | 4/1999 | McDermott | |
| 5,894,196 A | 4/1999 | McDermott | |
| 5,898,267 A | 4/1999 | McDermott | |
| 5,924,788 A | 7/1999 | Parkyn, Jr. | |
| 5,939,996 A | 8/1999 | Kniveton et al. | |
| 5,995,291 A | 11/1999 | Togino | |
| 6,097,549 A | 8/2000 | Jenkins et al. | |
| 6,229,160 B1 | 5/2001 | Krames et al. | |
| 6,244,727 B1 | 6/2001 | Ryan, Jr. et al. | |
| 6,250,787 B1 | 6/2001 | Matubara | |
| 6,273,596 B1 | 8/2001 | Parkyn, Jr. | |
| 6,274,924 B1 | 8/2001 | Carey et al. | |
| 6,283,613 B1 | 9/2001 | Schaffer | |
| 6,296,376 B1 | 10/2001 | Kondo et al. | |
| 6,323,063 B2 | 11/2001 | Krames et al. | |
| 6,361,190 B1 | 3/2002 | McDermott | |
| 6,361,192 B1 | 3/2002 | Fussell et al. | |
| 6,443,594 B1 | 9/2002 | Marshall et al. | |
| 6,473,238 B1 | 10/2002 | Daniell | |
| 6,481,130 B1 | 11/2002 | Wu | |
| 6,498,355 B1 | 12/2002 | Harrah et al. | |
| 6,502,956 B1 | 1/2003 | Wu | |
| 6,504,301 B1 | 1/2003 | Lowery | |
| 6,536,923 B1 | 3/2003 | Merz | |
| 6,541,800 B2 | 4/2003 | Barnett et al. | |
| 6,547,423 B2 | 4/2003 | Marshall et al. | |
| 6,550,940 B2 | 4/2003 | Kamiya et al. | |
| 6,554,451 B1 | 4/2003 | Keuper | |
| 6,560,038 B1 | 5/2003 | Parkyn, Jr. et al. | |
| 6,570,190 B2 | 5/2003 | Krames et al. | |
| 6,598,998 B2 | 7/2003 | West et al. | |
| 6,601,962 B1 | 8/2003 | Ehara et al. | |
| 6,607,286 B2 | 8/2003 | West et al. | |
| 6,616,299 B2 | 9/2003 | Martineau | |
| 6,637,921 B2 | 10/2003 | Coushaine | |
| 6,679,621 B2 | 1/2004 | West et al. | |
| 6,682,211 B2 | 1/2004 | English et al. | |
| 6,721,101 B2 | 4/2004 | Daniell | |
| 6,730,940 B1 | 5/2004 | Steranka et al. | |
| 6,808,293 B2 | 10/2004 | Watanabe et al. | |
| 6,837,605 B2 | 1/2005 | Reill | |
| 6,846,101 B2 | 1/2005 | Coushaine | |
| 6,851,835 B2 | 2/2005 | Smith et al. | |
| 6,896,381 B2 | 5/2005 | Benitez et al. | |
| 6,903,376 B2 | 6/2005 | Shen et al. | |
| 6,918,677 B2 | 7/2005 | Shipman | |
| 6,924,943 B2 | 8/2005 | Minano et al. | |
| 6,929,384 B2 | 8/2005 | Watanabe et al. | |
| 6,948,840 B2 | 9/2005 | Grenda et al. | |
| 6,955,451 B2 | 10/2005 | Coushaine et al. | |
| 6,987,613 B2 | 1/2006 | Pocius et al. | |
| 6,991,355 B1 | 1/2006 | Coushaine et al. | |
| 6,995,402 B2 | 2/2006 | Ludowise et al. | |
| 7,009,213 B2 | 3/2006 | Camras et al. | |
| 7,021,797 B2 | 4/2006 | Minano et al. | |
| 7,042,021 B2 | 5/2006 | Isoda | |
| 7,053,419 B1 | 5/2006 | Camras et al. | |
| 7,063,441 B2 | 6/2006 | Kramer et al. | |
| 7,063,450 B2 | 6/2006 | Ehara et al. | |
| 7,064,355 B2 | 6/2006 | Camras et al. | |
| 7,080,932 B2 | 7/2006 | Keuper | |
| 7,083,313 B2 | 8/2006 | Smith | |
| 7,104,672 B2 | 9/2006 | Zhang | |
| 7,106,523 B2 | 9/2006 | McLean et al. | |
| 7,111,972 B2 | 9/2006 | Coushaine et al. | |
| 7,114,838 B2 | 10/2006 | Wu | |
| 7,118,236 B2 | 10/2006 | Hahm et al. | |
| 7,118,262 B2 | 10/2006 | Negley | |
| 7,121,691 B2 | 10/2006 | Coushaine et al. | |
| 7,125,143 B2 | 10/2006 | Hacker | |
| 7,125,160 B2 | 10/2006 | Wong et al. | |
| 7,150,553 B2 | 12/2006 | English et al. | |
| 7,153,000 B2 | 12/2006 | Park et al. | |
| 7,153,002 B2 | 12/2006 | Kim et al. | |
| 7,172,324 B2 | 2/2007 | Wu et al. | |
| 7,181,378 B2 | 2/2007 | Benitez et al. | |
| 7,182,497 B2 | 2/2007 | Lee et al. | |
| 7,213,945 B2 | 5/2007 | Yoneda et al. | |
| 7,246,923 B2 | 7/2007 | Conner | |
| 7,246,931 B2 | 7/2007 | Hsieh et al. | |
| 7,248,723 B2 | 7/2007 | Breeuwer | |
| 7,254,309 B1 | 8/2007 | Chou et al. | |
| 7,280,288 B2 | 10/2007 | Loh et al. | |
| 7,329,029 B2 | 2/2008 | Chaves et al. | |
| 7,348,723 B2 | 3/2008 | Yamaguchi et al. | |
| 7,352,011 B2 | 4/2008 | Smits et al. | |
| 7,410,275 B2 | 8/2008 | Sommers et al. | |
| 7,411,742 B1 | 8/2008 | Kim et al. | |
| 7,549,769 B2 | 6/2009 | Kim et al. | |
| 7,674,018 B2 | 3/2010 | Holder et al. | |
| 7,722,227 B2 | 5/2010 | Zhang et al. | |
| 7,766,509 B1 | 8/2010 | Laporte | |
| 7,837,374 B2 * | 11/2010 | Hsu et al. | 362/612 |
| 7,841,750 B2 | 11/2010 | Wilcox et al. | |
| 7,854,536 B2 | 12/2010 | Holder et al. | |
| 7,866,837 B2 | 1/2011 | Ho | |
| 7,901,098 B2 | 3/2011 | Saitoh et al. | |
| 7,922,369 B2 | 4/2011 | Condon et al. | |
| 7,938,559 B2 | 5/2011 | Angelini et al. | |
| 7,942,558 B2 | 5/2011 | Zweig et al. | |
| 8,002,435 B2 * | 8/2011 | Laporte | 362/249.02 |
| 8,058,665 B2 | 11/2011 | Wang et al. | |
| 8,132,944 B2 | 3/2012 | Ruud et al. | |
| 8,231,248 B2 | 7/2012 | Fu et al. | |
| 8,348,475 B2 | 1/2013 | Wilcox et al. | |
| 8,385,338 B2 | 2/2013 | Lee | |
| 8,388,193 B2 | 3/2013 | Wilcox et al. | |
| 8,469,552 B2 | 6/2013 | Moeller | |
| 8,494,337 B2 * | 7/2013 | Grotsch | G02B 6/002 385/146 |
| 8,573,815 B2 | 11/2013 | Mallory et al. | |
| 8,632,216 B2 * | 1/2014 | Duong | H01L 33/58 362/244 |
| 2004/0037076 A1 | 2/2004 | Katoh et al. | |
| 2004/0114355 A1 | 6/2004 | Rizkin | |
| 2004/0156209 A1 | 8/2004 | Ishida | |
| 2004/0207999 A1 | 10/2004 | Suehiro et al. | |
| 2004/0212291 A1 | 10/2004 | Keuper | |
| 2005/0073849 A1 | 4/2005 | Rhoads et al. | |
| 2005/0083699 A1 | 4/2005 | Rhoads et al. | |
| 2005/0179041 A1 | 8/2005 | Harbers et al. | |
| 2005/0205878 A1 | 9/2005 | Kan | |
| 2005/0224826 A1 | 10/2005 | Keuper et al. | |
| 2005/0281047 A1 | 12/2005 | Coushaine et al. | |
| 2006/0013000 A1 | 1/2006 | Coushaine et al. | |
| 2006/0013002 A1 | 1/2006 | Coushaine et al. | |
| 2006/0039143 A1 | 2/2006 | Katoh et al. | |

(56) References Cited

U.S. PATENT DOCUMENTS

| | | |
|---|---|---|
| 2006/0044806 A1 | 3/2006 | Abramov et al. |
| 2006/0067640 A1 | 3/2006 | Hsieh et al. |
| 2006/0082999 A1 | 4/2006 | Klein |
| 2006/0083000 A1 | 4/2006 | Yoon et al. |
| 2006/0105482 A1 | 5/2006 | Alferink et al. |
| 2006/0181902 A1 | 8/2006 | Tamura et al. |
| 2006/0186431 A1 | 8/2006 | Miki et al. |
| 2006/0198144 A1 | 9/2006 | Miyairi et al. |
| 2007/0019416 A1 | 1/2007 | Han et al. |
| 2007/0058369 A1 | 3/2007 | Parkyn et al. |
| 2007/0097693 A1 | 5/2007 | Klose |
| 2007/0133209 A1 | 6/2007 | Wang et al. |
| 2007/0177389 A1 | 8/2007 | Pickard et al. |
| 2007/0201225 A1 | 8/2007 | Holder et al. |
| 2007/0258248 A1 | 11/2007 | Duhe, Jr. |
| 2007/0263393 A1 | 11/2007 | Van De Ven |
| 2007/0274667 A1 | 11/2007 | Loh et al. |
| 2008/0084693 A1 | 4/2008 | Shimada et al. |
| 2008/0084701 A1 | 4/2008 | Van De Ven et al. |
| 2008/0101063 A1 | 5/2008 | Koike et al. |
| 2008/0106907 A1 | 5/2008 | Trott et al. |
| 2008/0130298 A1 | 6/2008 | Negley et al. |
| 2008/0205061 A1 | 8/2008 | Holder et al. |
| 2008/0239722 A1 | 10/2008 | Wilcox |
| 2009/0067172 A1 | 3/2009 | Inoue et al. |
| 2009/0086498 A1 | 4/2009 | Condon et al. |
| 2009/0097262 A1 | 4/2009 | Zhang et al. |
| 2009/0290360 A1 | 11/2009 | Wilcox et al. |
| 2009/0298376 A1 | 12/2009 | Guillien et al. |
| 2010/0014286 A1 | 1/2010 | Yoneda et al. |
| 2010/0022727 A1 | 1/2010 | Al-Arifi |
| 2010/0027271 A1 | 2/2010 | Wilcox et al. |
| 2010/0027274 A1 | 2/2010 | Liu et al. |
| 2010/0039810 A1 | 2/2010 | Holder et al. |
| 2010/0073927 A1 | 3/2010 | Lewin et al. |
| 2010/0085763 A1 | 4/2010 | Aguglia |
| 2010/0085764 A1 | 4/2010 | Chuang |
| 2010/0110695 A1 | 5/2010 | Nakamura |
| 2010/0128488 A1 | 5/2010 | Marcoux |
| 2010/0135028 A1 | 6/2010 | Kokubo |
| 2010/0165640 A1* | 7/2010 | Lin .................. F21V 5/04 362/336 |
| 2010/0247182 A1 | 9/2010 | Miyata et al. |
| 2010/0271708 A1 | 10/2010 | Wilcox |
| 2010/0271829 A1 | 10/2010 | LaPorte |
| 2010/0295071 A1 | 11/2010 | Tsai et al. |
| 2010/0302786 A1 | 12/2010 | Wilcox et al. |
| 2010/0328941 A1 | 12/2010 | Zhang et al. |
| 2011/0019425 A1 | 1/2011 | Chen et al. |
| 2011/0026247 A1 | 2/2011 | Zhang |
| 2011/0103070 A1 | 5/2011 | Zhang et al. |
| 2011/0110098 A1 | 5/2011 | Fu |
| 2011/0115360 A1 | 5/2011 | Holder |
| 2011/0164425 A1 | 7/2011 | Chen |
| 2011/0186897 A1 | 8/2011 | Loh |
| 2011/0235338 A1* | 9/2011 | Chen .................. F21V 5/04 362/311.02 |
| 2012/0051047 A1 | 3/2012 | Lu et al. |

FOREIGN PATENT DOCUMENTS

| | | |
|---|---|---|
| JP | 60199746 | 10/1985 |
| JP | 61160328 | 7/1986 |
| JP | 61185980 | 8/1986 |
| JP | 61214485 | 9/1986 |
| JP | S61214000 A | 9/1986 |
| JP | 8264839 | 10/1996 |
| WO | WO8600146 A1 | 1/1986 |
| WO | WO9950596 | 10/1999 |
| WO | WO0024062 | 4/2000 |
| WO | 2006109113 A2 | 10/2006 |
| WO | WO2006111805 A1 | 10/2006 |
| WO | WO2007018927 A2 | 2/2007 |
| WO | WO2008144672 A1 | 11/2008 |

* cited by examiner

LENS FOR PREFERENTIAL-SIDE DISTRIBUTION

RELATED APPLICATION

This application is a continuation-in-part of currently patent application Ser. No. 13/408,882, filed Feb. 29, 2012 now U.S. Pat. No. 9,541,257. The contents of the parent application are incorporated herein by reference.

FIELD OF THE INVENTION

The invention relates generally to the field of lighting systems and, more particularly, to apparatus for utilizing LED light sources for illuminating areas with a predefined pattern of light intensity.

BACKGROUND OF THE INVENTION

There is a need for lighting apparatus which is low-cost and energy efficient. LEDs (light-emitting diodes) provide light sources which are energy efficient, and advances in LED technology are providing even greater such efficiencies over time. Some typical applications for lighting systems are roadway and parking lot lighting in which there are performance requirements such as the requirement that light be uniformly distributed over areas which are to be lighted while the neighboring regions are to be substantially free of light spillage. In applications such as the "front-line" illumination of automobile sales lots, there is a need to direct light in order to draw particular customer attention to featured vehicles displayed in the front line of a sales lot.

SUMMARY OF THE INVENTION

One aspect of this invention is an improved lens for directing a majority of light from a light emitter toward a preferential side. The emitter, having an axis, may include at least one light-emitting diode (LED). Such emitters may include an LED package which has a primary lens over the at least one LED. In such embodiments, the inventive lens may be a secondary lens placed over the primary lens.

The lens of this invention includes a base forming an opening to a cavity defined by an inner surface and a reflecting surface positioned to reflect light received from the inner surface toward a main output surface which is transverse the axis. The opening may receive the emitter therethrough such that the cavity may be surrounding the emitter.

In some embodiments of this invention, the cavity opening is substantially rectangular. The term "substantially rectangular," as used herein with respect to the cavity opening, means (1) that the cavity opening has four sides and (2) that at least about one-third of the cross-dimension of each side of the cavity opening is straight or that at least about one-third of the cross-dimension of the longer sides (if there is a pair of longer sides) is substantially straight. (It should be recognized that the "square" is a subset of "rectangular.") In certain embodiments, at least about half of the cross-dimension of each side is substantially straight, and it has been found advantageous to have at least about two-thirds of the cross-dimension of each side be straight.

In some of the embodiments with a substantially rectangular cavity opening, at least about half of the cross-dimension of each side of the cavity opening is straight. In some other versions of such embodiments, at least about two-thirds of the cross-dimension of each side of the cavity opening is straight.

In certain embodiments, the inner surface may be configured for primarily refracting emitter light and includes a surrounding inner surface which extends from the opening and terminates at an inner end surface which is transverse the axis and is positioned to refract light from the emitter toward the preferential side. In some of such embodiments, the surrounding inner surface extends from the opening substantially parallel to the emitter axis.

It should be noted that while rounded corners of the cavity opening and of the surrounding inner wall do not impact the distribution of light in a significant way, such rounding provides advantages during manufacturing of the inventive lens. In particular, the minimizing of sharpness at corners facilitates accurate molding of the inventive lens.

The base defines a plane substantially normal to the axis. In embodiments of the lens which are configured for directing light toward the preferential side, the inner end surface extends between front and back edges, the back edge being farther from the plane than the front edge. In such embodiments, the inner end surface may include front and back facets angled with respect to one another and each extending from the respective one of the front and back edges to a centrally-located side-to-side juncture. In some of these embodiments, the inner end surface includes a pair of each of the front and back facets, the facets of each pair being adjoined along a centrally-located front-to-back juncture and extending from the front-to-back juncture toward the base. In some versions of the inner end surface, the front and back facets are substantially planar.

In some embodiments of the inventive lens, the reflecting surface extends from the base away from the axis radially outwardly of and around the inner surface. The reflecting surface may include front and back curvatures and a pair of substantially-identical lateral curvatures each adjoining the front and back curvatures. The front curvature has a front-curvature configuration which differs from the configuration of the back curvature. Configuration of the lateral curvatures differs from configurations of the front and back curvatures. It should be understood that the term "curvature" refers to a three-dimensional curved surface.

The reflecting surface extends from a base edge toward the main output surface. And, in the embodiments with the substantially rectangular cavity opening, the base edge is substantially equidistantly spaced from a respective side of the cavity opening. In other words, the base edge of the reflecting surface may also be substantially rectangular around the substantially rectangular cavity opening.

Another aspect of the rounded corners of the cavity opening and the base edge of the reflecting surface is that such rounding provides smooth transition from the lateral curvatures to the front and back curvatures.

In the embodiments of the lens configured for preferential-side light distribution, the back curvature terminates at greater distances from the base plane than does the front curvature. The front and back curvatures are preferably each bilaterally symmetric.

In certain of the embodiments of the lens for preferential-side light distribution, the main output surface is configured for directing light toward the preferential side. In certain of such embodiments, the main output surface includes front and back sectors, the front sector spanning greater than 180° about the emitter axis. The front and back sectors may each be bilaterally symmetric along a front-to-back plane which includes the emitter axis.

In some of such embodiments, the main output surface is disposed at distances from the base plane which are greatest along the back of the back sector and gradually decrease toward the front of the front sector.

The main output surface has an edge including back-sector and front-sector portions. In some variants, a projection of the front-sector edge portion on the base plane extends along a circle. The back-sector edge portion may be substantially linear and extend between the ends of the front-sector edge portion.

In certain embodiments, the main output surface includes a singularity point on a front-to-back plane which includes the emitter axis. In some of such embodiments, the front sector includes a convex curvature extending from the singularity point. The back sector may also include a convex curvature extending from the singularity point, the back sector adjoining the front sector along planes each of which includes the singularity point and one of the ends of the front-sector edge portion. The singularity point may be offset from the emitter axis toward the preferential side. In some embodiments, the front and back sectors are each bilaterally symmetric along the front-to-back plane which includes the emitter axis.

When the inventive lens is installed in a lighting fixture for illuminating a front line of an automobile sales lot, the side-facing configuration of the facets of the inner end surface in combination with the configuration of the main output surface facilitate directing light for an extended distance along the front line of the lot. In such applications, the combination of the reflecting surface and the configuration of the main output surface minimizes back light with a desirable cut-off at a light pole with maximum illumination of the front line and minimal light directed beyond the front line. This creates a long and narrow illumination pattern that meets the needs for front-line illumination of automobile sales lots, but may also be used for illuminating similar areas, such as single-lane streets.

The inventive lens may further include an outer surrounding-wall surface which extends from the main output surface toward the base plane. In some embodiments, the outer surrounding-wall surface is substantially cylindrical and substantially parallel to the emitter axis. An outward flange may extend from the outer surrounding-wall surface away from the emitter axis.

In certain embodiments, the inventive lens is bilaterally symmetric in a front-to-back direction.

The term "transverse," as used herein in reference to the inner end surface and the main output surface with respect to the emitter axis, means that these surfaces intersect the emitter axis. In some of such embodiments, the inner end surface and the main output surface are each substantially normal to the emitter axis.

In descriptions of this invention, including in the claims below, the terms "comprising," "including" and "having" (each in their various forms) and the term "with" are each to be understood as being open-ended, rather than limiting, terms.

DETAILED DESCRIPTION OF ILLUSTRATED EMBODIMENTS

Figure 1:
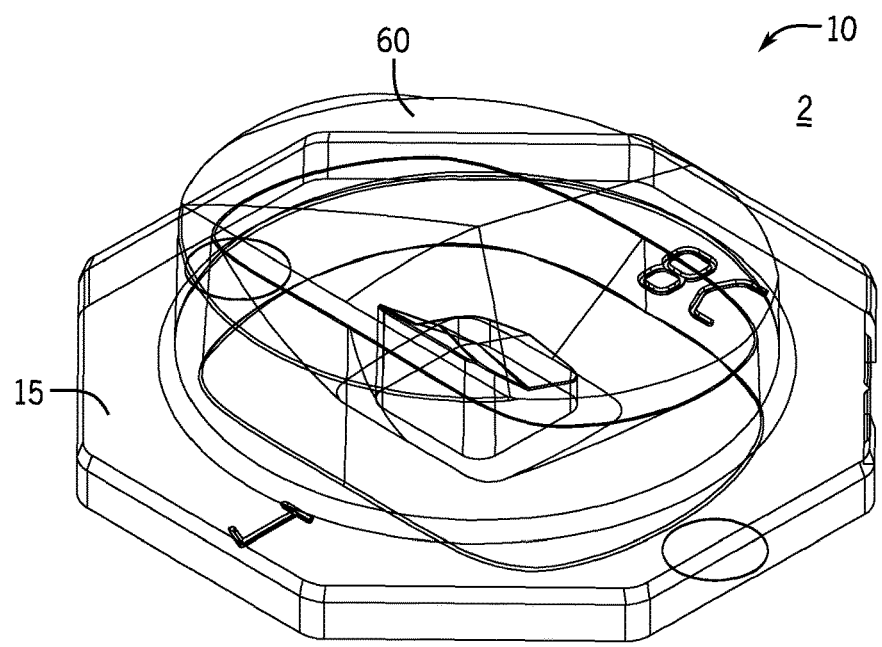
FIG. 1 is a transparent perspective view of one embodiment of the lens of the present invention showing the lens from the light-output side.
Figure 2:
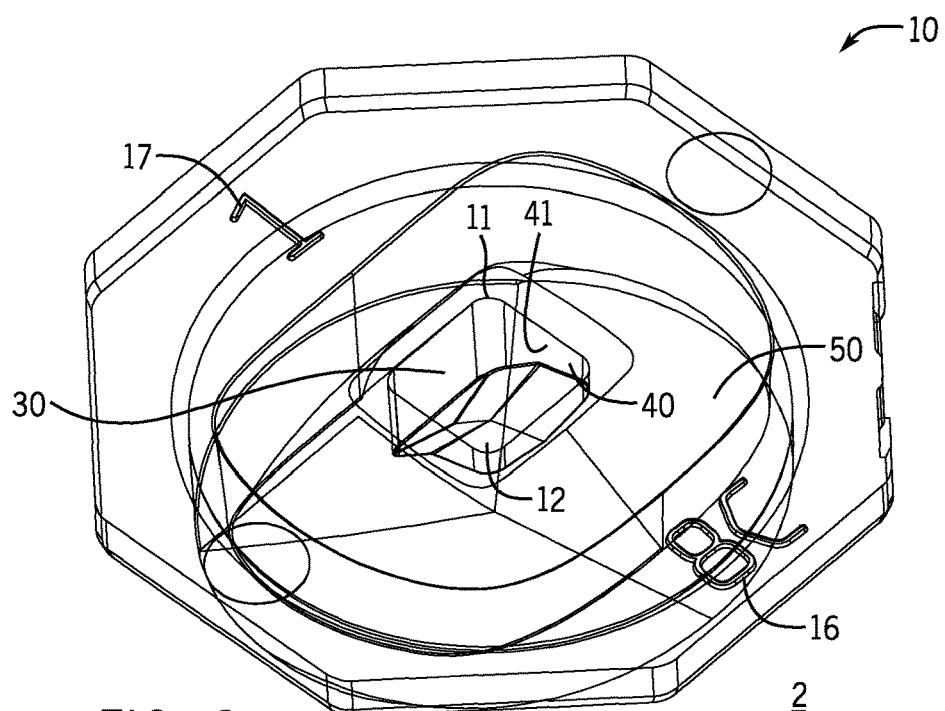
FIG. 2 is a transparent perspective view showing the lens of FIG. 1 from the base side.

FIGS. 1-34 show aspects of an exemplary embodiment of a lens 10 in accordance with this invention. Lens 10 is configured for directing a majority of light from a light emitter 20 toward a preferential-side 2. As seen in FIGS. 16 and 18, emitter 20 has an axis 21.

The lens of this invention includes a base 11 forming an opening 30 to a cavity 12 defined by an inner surface 40, and a reflecting surface 50 positioned to reflect light received from inner surface 40 toward a main output surface 60 which is transverse axis 21. It is seen in FIGS. 15-18 that base 11 defines a plane 110 substantially normal to axis 21. FIGS. 16 and 18 show opening 30 receiving emitter 20 therethrough such that cavity 12 surrounds emitter 20.

Figure 4:
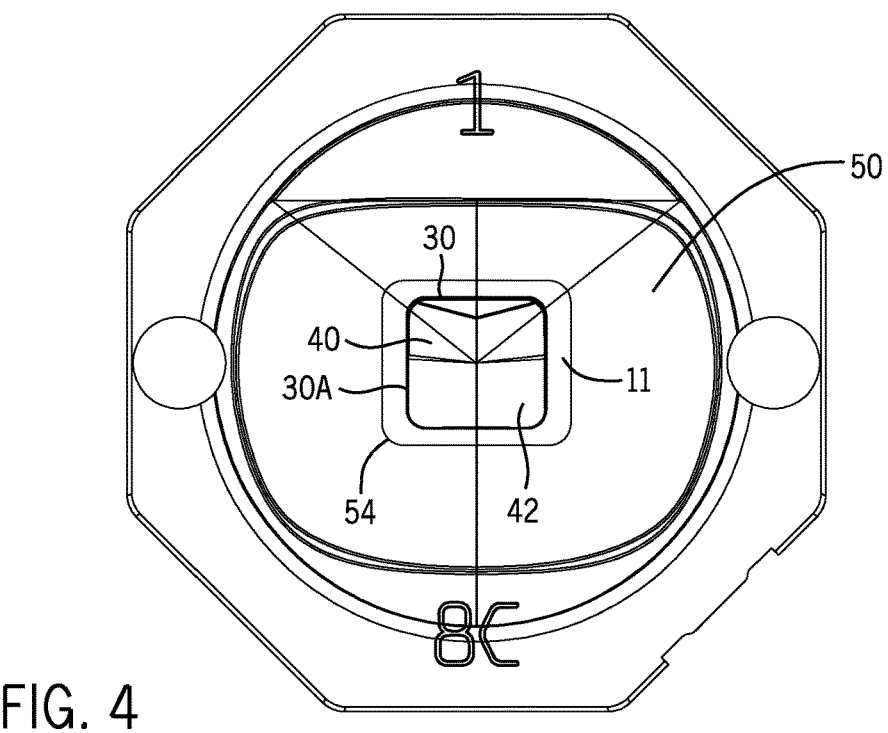
FIG. 4 is a transparent base-side plan view of the embodiment of the lens of FIG. 1.
Figure 5:
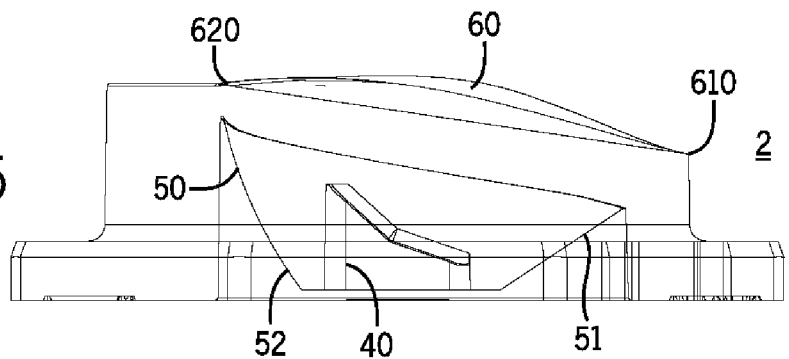
FIG. 5 is a transparent lateral elevation of the embodiment of the lens of FIG. 1.
Figure 11:
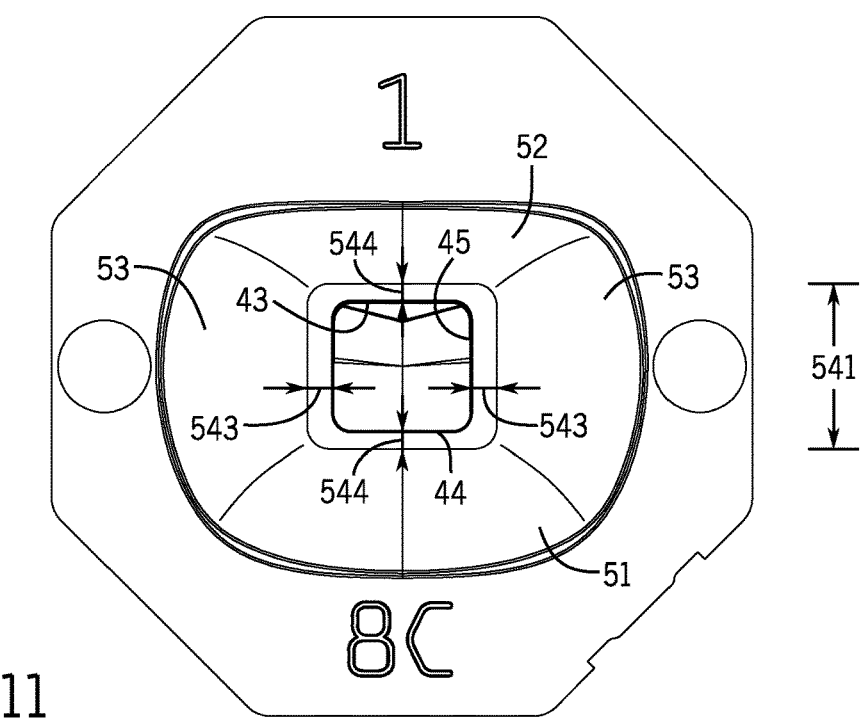
FIG. 11 is an opaque base-side plan view of the lens of FIG. 1.
Figure 12:
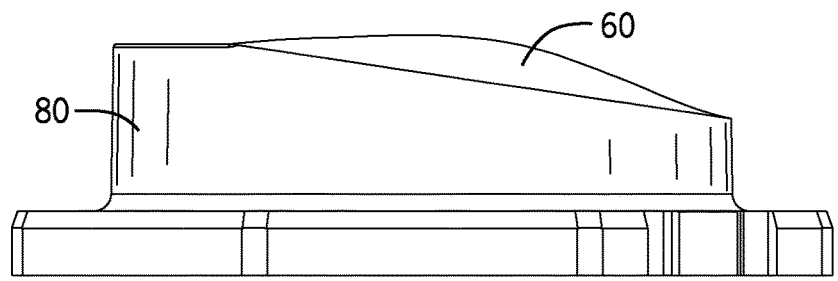
FIG. 12 is an opaque lateral elevation of the lens of FIG. 1.
Figure 13:
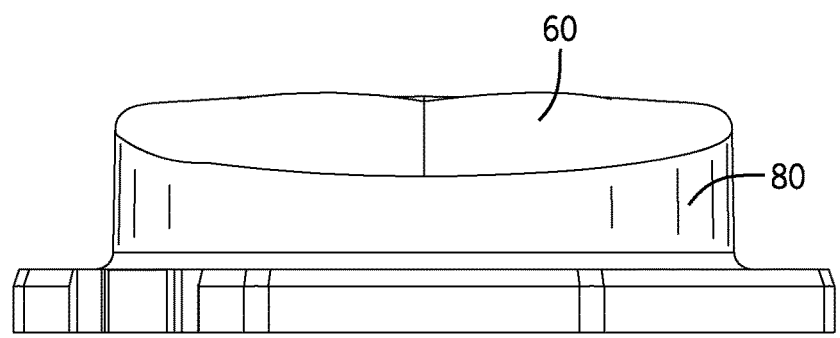
FIG. 13 is an opaque front elevation of the lens of FIG. 1.
Figure 14:
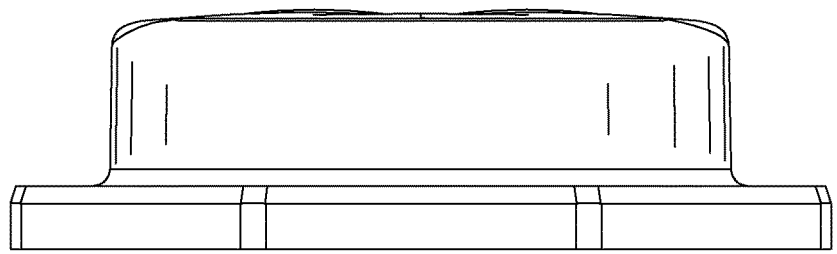
FIG. 14 is an opaque back elevation of the lens of FIG. 1.
Figure 25:
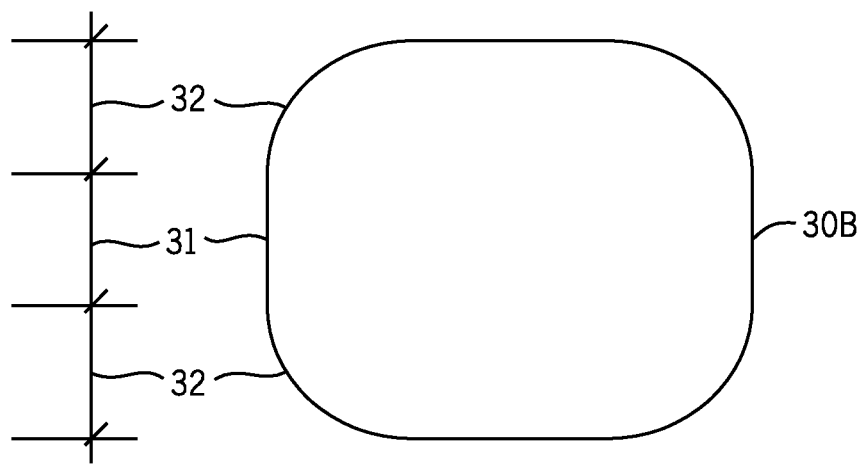
FIG. 25 is a fragmentary base-side plan view of an alternative embodiment illustrating a variant of the substantially rectangular cavity opening.
Figure 26:
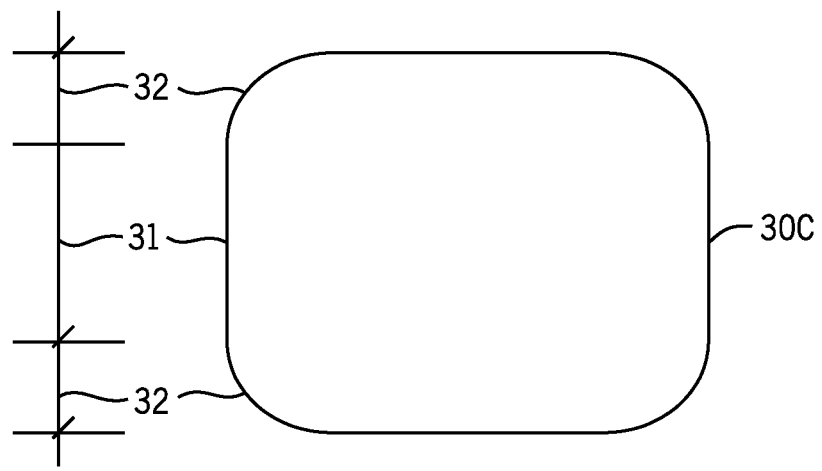
FIG. 26 is another fragmentary base-side plan view of another alternative embodiment illustrating another variant of the substantially rectangular cavity opening.

FIGS. 4, 11, 25 and 26 show cavity opening 30 substantially rectangular with four sides. In FIGS. 4 and 11, cavity opening 30A has about two-thirds of the cross-dimension of each side being straight. FIG. 25 shows substantially rectangular cavity opening 30B with about one-third of the cross-dimension of each side of the cavity opening being straight 31 between curved corners 32. And, FIG. 26 shows substantially rectangular cavity opening 30C with about half of the cross-dimension of each side being substantially straight 31 between curved corners 32.

FIGS. 1-18 illustrate inner surface 40 configured for primarily refracting emitter light and includes a surrounding inner surface 41 which extends from opening 30 and terminates at an inner end surface 42 which is transverse axis 21 and is positioned to refract light from emitter 20 toward preferential side 2, as best seen in FIG. 18.

Figure 15:
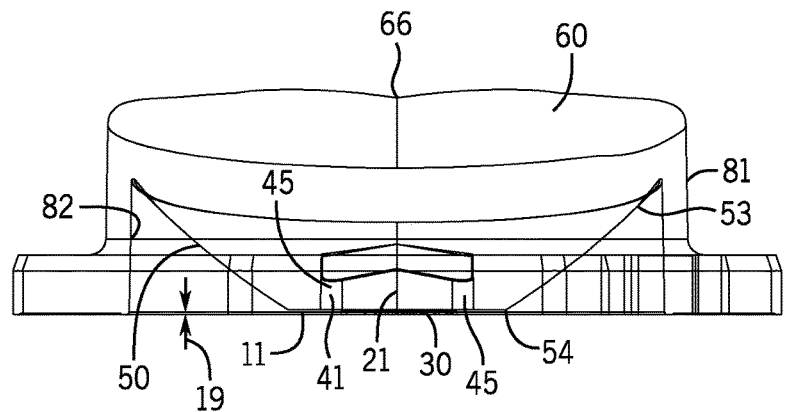
FIG. 15 is a side-to-side sectional view of the lens of FIG. 1, taken along section 15-15 shown in FIG. 3.
Figure 16:
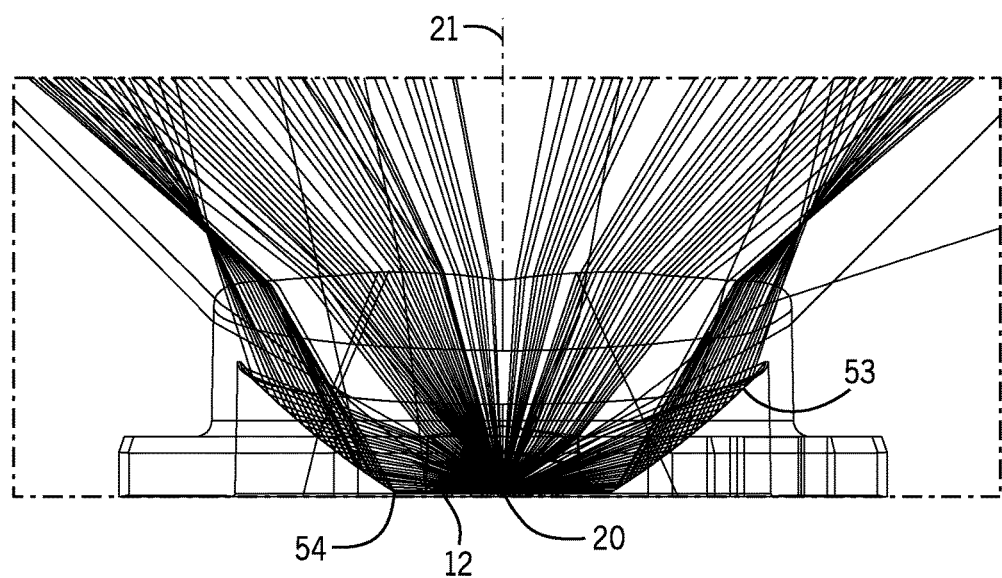
FIG. 16 is another side-to-side sectional view illustrating lateral aspects of the light distribution of the lens.
Figure 17:
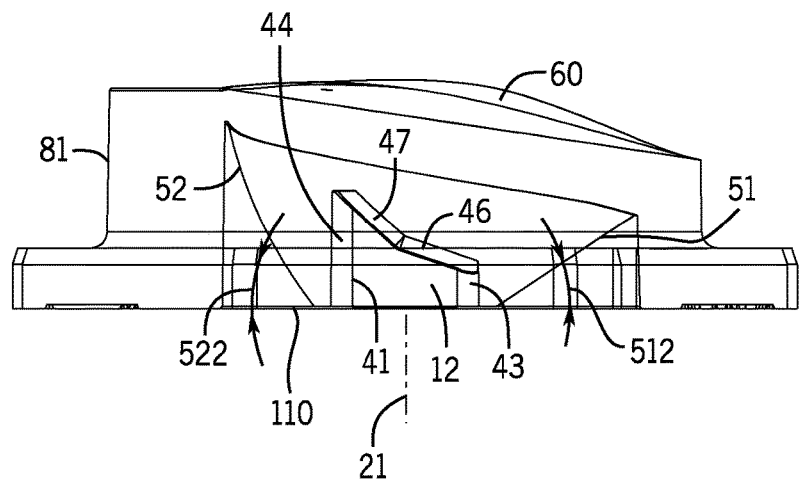
FIG. 17 is a front-to-back sectional view of the lens of FIG. 1, taken along section 17-17 shown in FIG. 4.
Figure 18:
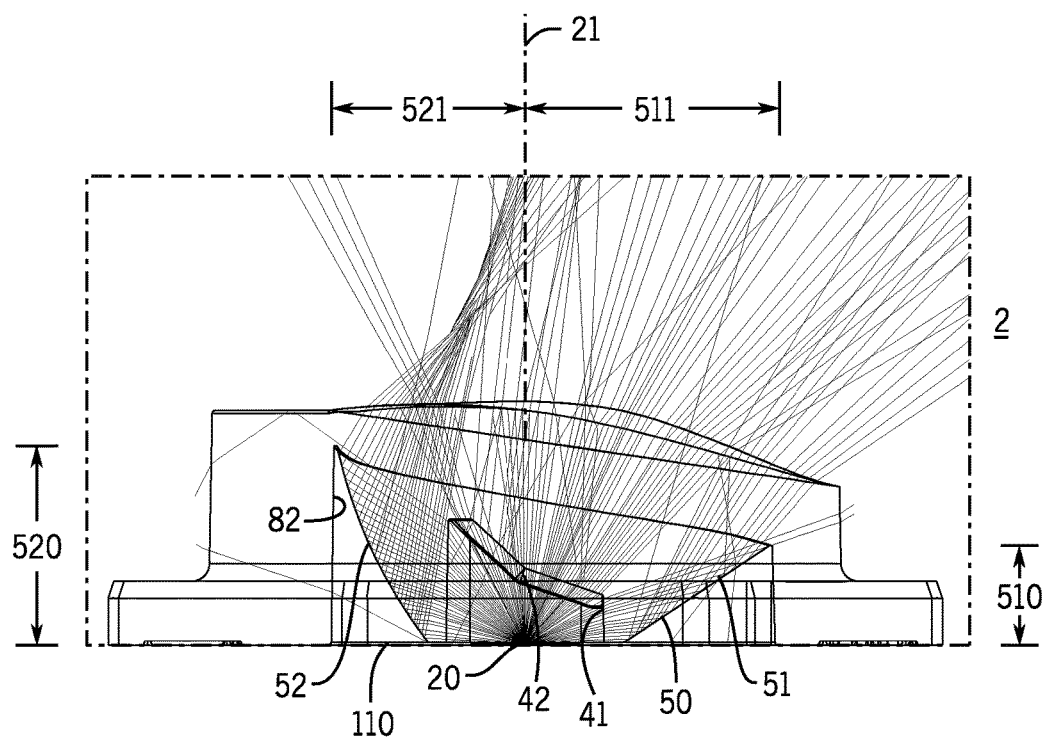
FIG. 18 is another front-to-back sectional view representing the preferential-side light distribution of the lens.
Figure 19:
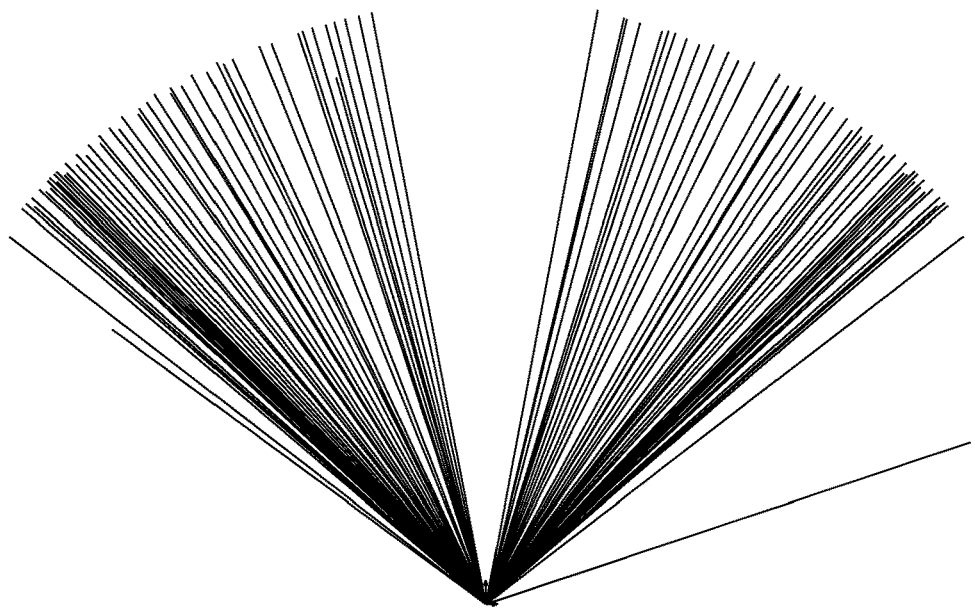
FIG. 19 is a ray-trace illustrating lateral light output of the lens as shown in FIG. 16.

FIGS. 1, 2, 5-7, 9, 11 and 15-18 show that reflecting surface 50 extends from base 11 away from axis 21 radially outwardly of and around inner surface 40. Reflecting surface 50 includes front and back curvatures 51 and 52 and a pair of substantially-identical lateral curvatures 53 each adjoining front and back curvatures 51 and 52. It is further seen in FIGS. 5, 17 and 18 that front curvature 51 has a front-curvature configuration which differs from the configuration of back curvature 52. FIGS. 17 and 18 show that back curvature 52 terminates at greater distances 520 from base plane 110 than distances 510 at which front curvature 51 terminates from base plane 110. FIGS. 4, 5, 11, 17 and 18 also show that front curvature 51 terminates at greater distances 511 from emitter axis 21 than distances 521 at which back curvature 52 terminates from emitter axis 21 such that back curvature extends at a greater angle 522 with respect to plane 110 than an angle 512 between front curvature 51 and base plane 110. FIGS. 4 and 11 show front and back curvatures 51 and 52 each bilaterally symmetric.

Figure 6:
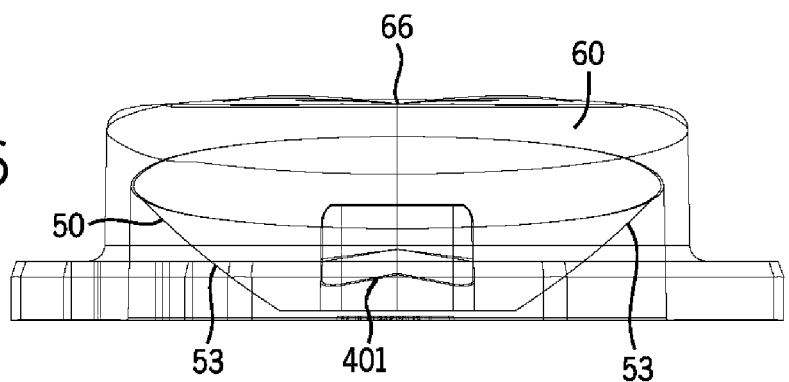
FIG. 6 is a transparent front elevation of the embodiment of the lens of FIG. 1.
Figure 7:
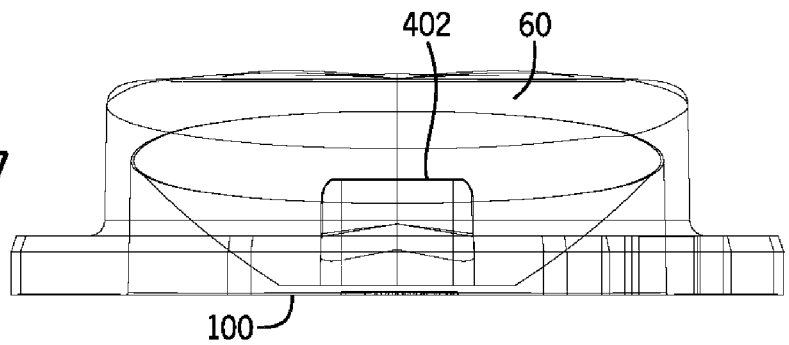
FIG. 7 is a transparent back elevation of the embodiment of the lens of FIG. 1.
Figure 8:
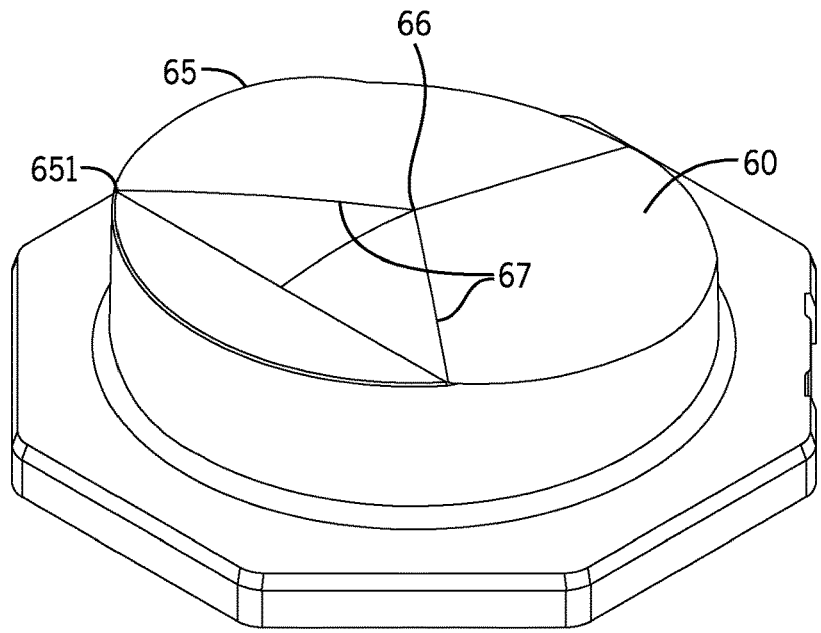
FIG. 8 is an opaque perspective view showing the lens of FIG. 1 from the light-output side.
Figure 9:
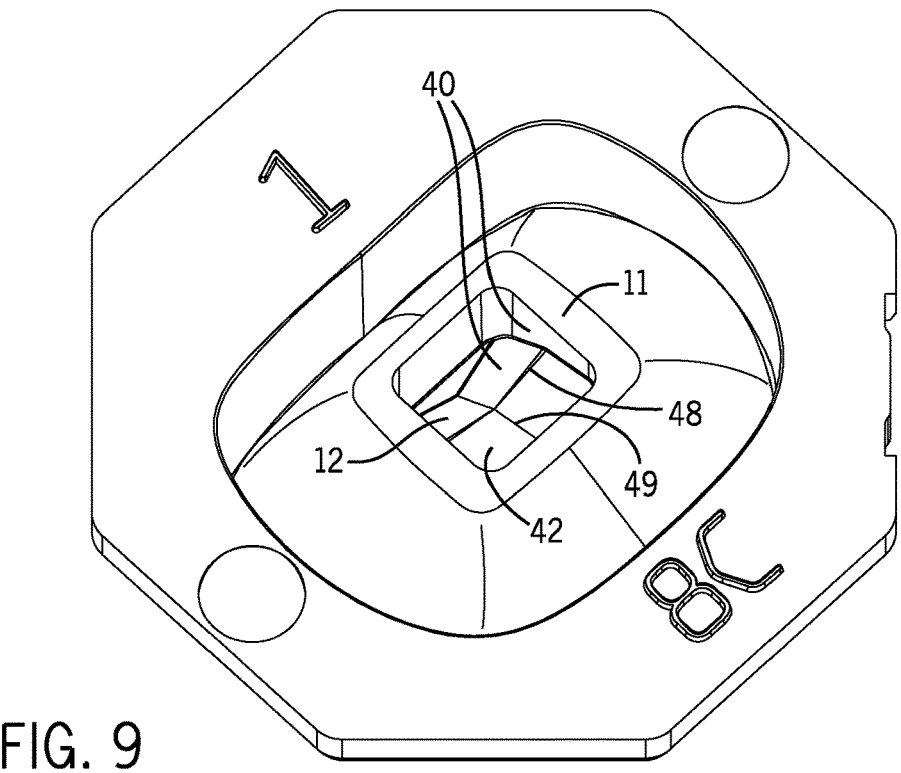
FIG. 9 is an opaque perspective view showing the lens of FIG. 1 from the base side.

FIGS. 6, 15 and 16 show that configuration of lateral curvatures 53 differ from configurations of front and back curvatures 51 and 52. FIGS. 15-18 show reflecting surface 50 being convex and extending from a base edge 54 toward main output surface 60.

FIGS. 2, 4, 9 and 11 illustrate substantially rectangular cavity opening 30 and base edge 54 substantially equidistantly spaced along each side of cavity opening 30 such that base edge 54 of reflecting surface 50 is also substantially rectangular around substantially rectangular cavity opening 30. It is also seen in FIGS. 4 and 11 that base edge 54 has a side-to-side dimension 542 which is greater than a front-to-back dimension 541. FIGS. 4 and 11 show opening 30 substantially square with the spacing 543 of base edge 54 from cavity opening 30 laterally being greater than spacing 544 forwardly and rearwardly such that front and back curvatures 51 and 52 extend from longer sides of base edge 54 than do lateral curvatures 53.

It is further seen in FIGS. 15-18 that surrounding inner surface 42 extends from opening 30 substantially parallel to emitter axis 21. FIGS. 11 and 15-18 best show inner surrounding surface 41 including front and back portions 43 and 44 and a pair of lateral portions 45. Lateral portions 45 each extends between front portion 43 and back portion 44 and each smoothly adjoins both front and back portions 43 and 44. FIG. 18 show front and back portions 43 and 44 receiving emitter light which is emitted forward and rearward. The front and back portions 43 and 44 refract such emitter light away from axis 21 toward front and back curvatures 51 and 52, respectively, of reflecting surface 50. FIG. 16 shows lateral portions 45 each receiving lateral emitter light and refracting such light away from emitter axis 21.

FIGS. 5-7, 11 and 15-18 illustrate inner end surface 41 extending between front and back edges 401 and 402. It is best seen in FIGS. 5-7 and 15-18 that back edge 402 is farther from plane 110 than front edge 401. It is further best seen in FIGS. 1-4, 9 and 15-18 that inner end surface 42 includes front and back facets 46 and 47 angled with respect to one another and each extending from the respective one of front and back edges 401 and 402 to a centrally-located side-to-side juncture 48. Front and back facets 46 and 47 are shown substantially planar. It is seen in FIG. 18 that such angled configuration of end surface 41 provides uniform distribution of light emitted within about a 30° angle around emitter axis 21 and removing so-called hot spots along axis 21 by spreading the light away from the hot spot location immediately about axis 21.

FIGS. 1, 2, 4, 9, 15 and 16 show that inner end surface 42 includes a pair of each of front and back facets 46 and 47. Facets of each pair are adjoined along a centrally-located front-to-back juncture 49 and extend from front-to-back juncture 49 toward base 11. It is seen in FIG. 16 that such lateral angled configuration of the pairs of front and back facets 46 and 47, i.e., the facets extending down from front-to-back juncture 49 when lens 10 is oriented with emitter 20 emitting light upwardly, provides lateral spread of light emitted within about a 50° angle around emitter axis 21, thereby providing broad light distribution (schematically shown in FIG. 19) beneficial for elongate illumination patterns as those required for illuminating front lines of automotive-sale parking lots.

FIGS. 1, 3, 5-8, 10 and 12-18 show main output surface 60 configured for directing light toward preferential side 2. Main output surface 60 includes front and back sectors 61 and 62. FIGS. 1, 3, 8 and 10 show front sector 61 spanning greater than 180° about emitter axis 21. These FIGURES also show front and back sectors 61 and 62 each bilaterally symmetric along a front-to-back plane 13 which includes emitter axis 21.

Figure 20:
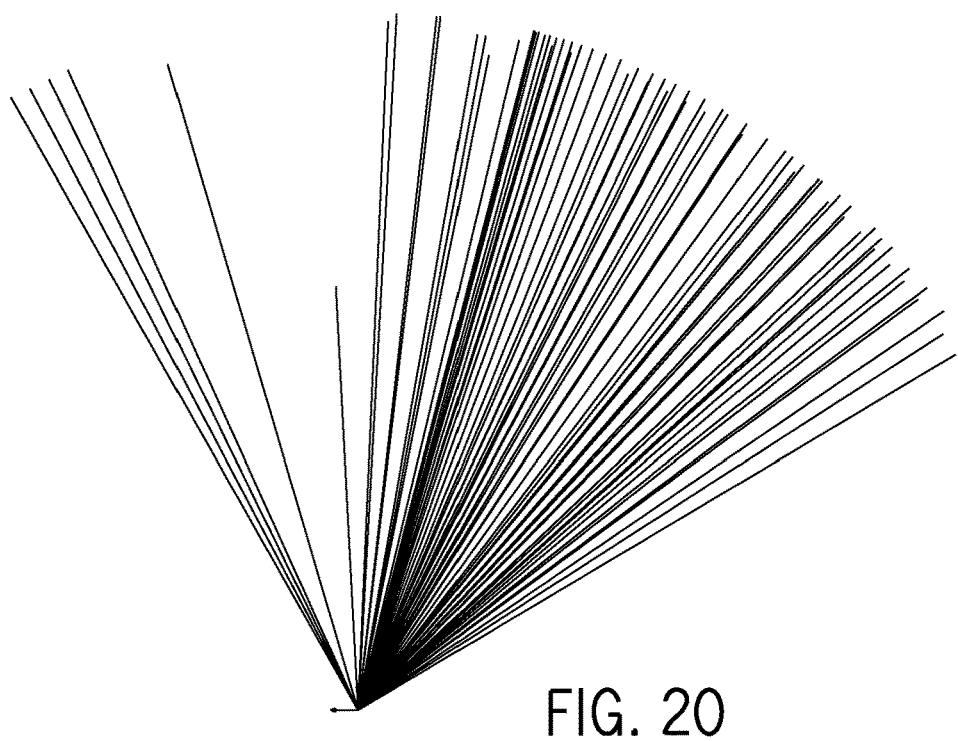
FIG. 20 is a ray-trace schematically illustrating preferential-side light output of the lens as shown in FIG. 18.

FIGS. 5, 12, 17 and 18 best illustrate main output surface 60 disposed at distances from base plane 110 which are greatest along the back 620 of back sector 62 and gradually decrease toward the front 610 of front sector 61. As seen in FIG. 18, the angling of main output surface 60 toward preferential side 2 facilitates refraction of light received from inner surface 40 and reflecting surface 50 by main output surface 60 toward preferential side 2, as schematically illustrated in FIG. 20.

Figure 3:
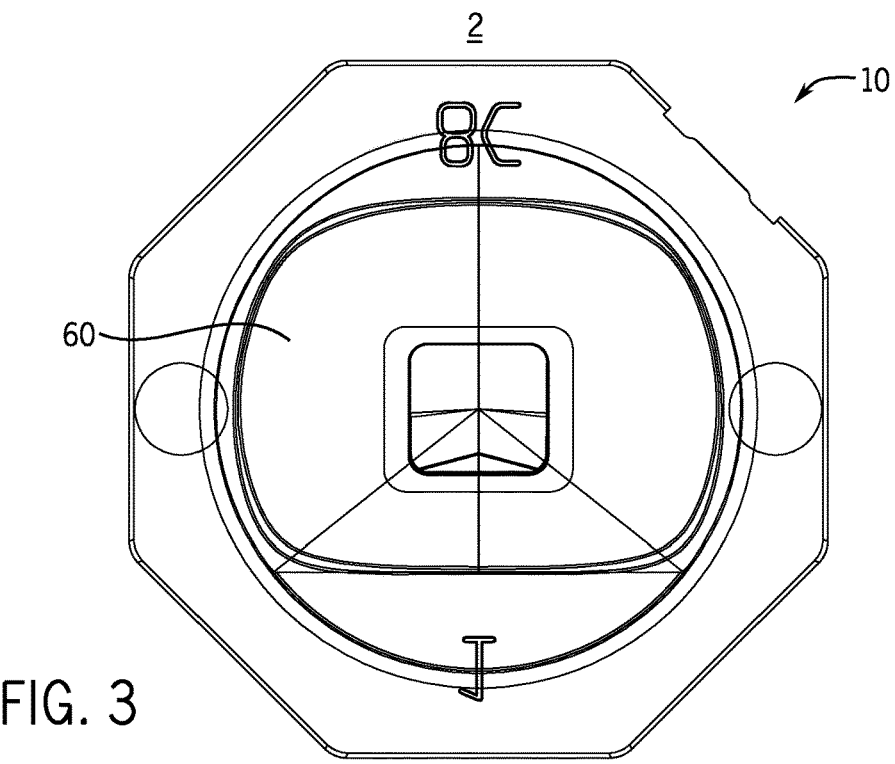
FIG. 3 is a transparent output-side plan view of the embodiment of the lens of FIG. 1.
Figure 10:
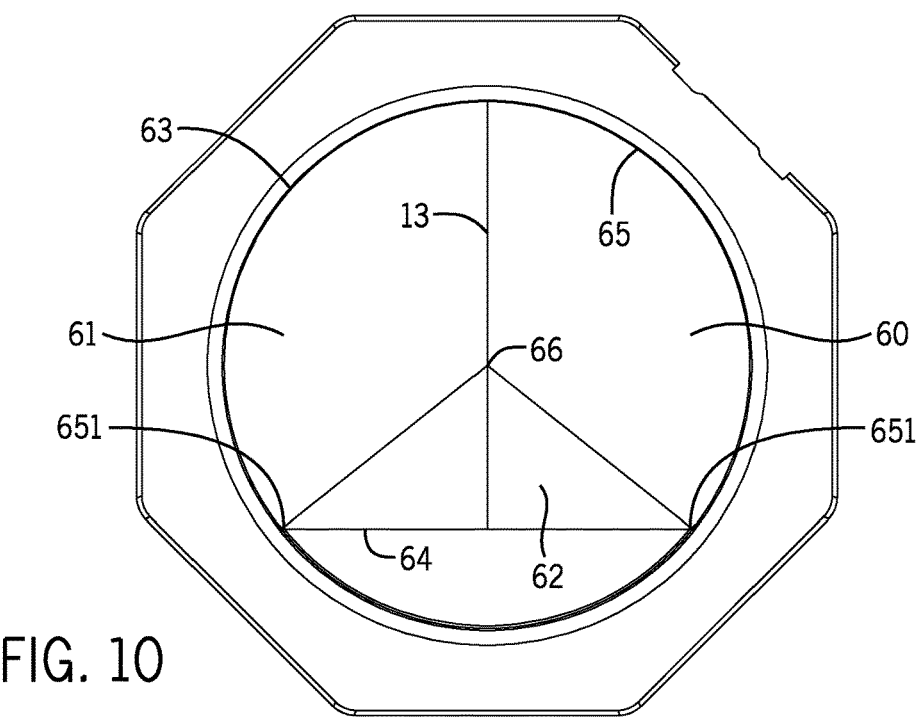
FIG. 10 is an opaque output-side plan view of the lens of FIG. 1.

Main output surface 60 has an edge 63 which includes back-sector and front-sector edge portions 64 and 65. FIGS. 3 and 10 show a projection of front-sector edge portion 65 on base plane 110 extending along a circle. The back-sector edge portion is shown substantially linear and extending between the ends 651 of front-sector edge portion 65.

Main output surface is shown to include a singularity point 66 on front-to-back plane 13. It is best seen in FIGS. 15 and 16 that front sector 61 includes a convex curvature extending from singularity point 66 and FIG. 6 best shows that back sector 62 includes a convex curvature extending from singularity point 66. FIGS. 1, 3, 8 and 10 best show back sector 62 adjoining front sector 61 along planes 67 each of which includes singularity point 66 and one of ends 651 of front-sector edge portion 65.

Figure 27:
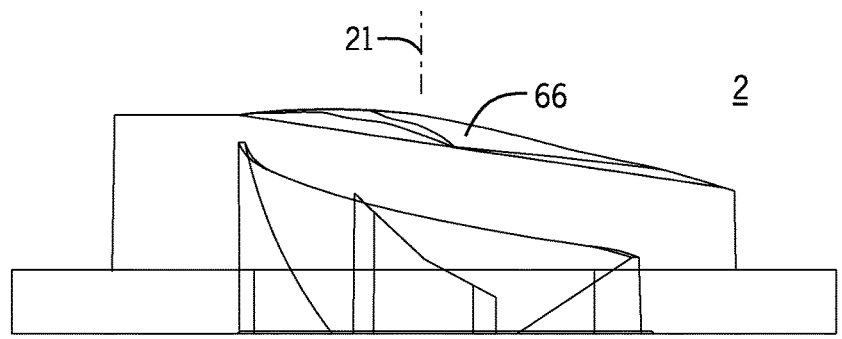
FIG. 27 is a side elevation of an alternative embodiment of the lens according to the present invention.
Figure 28:
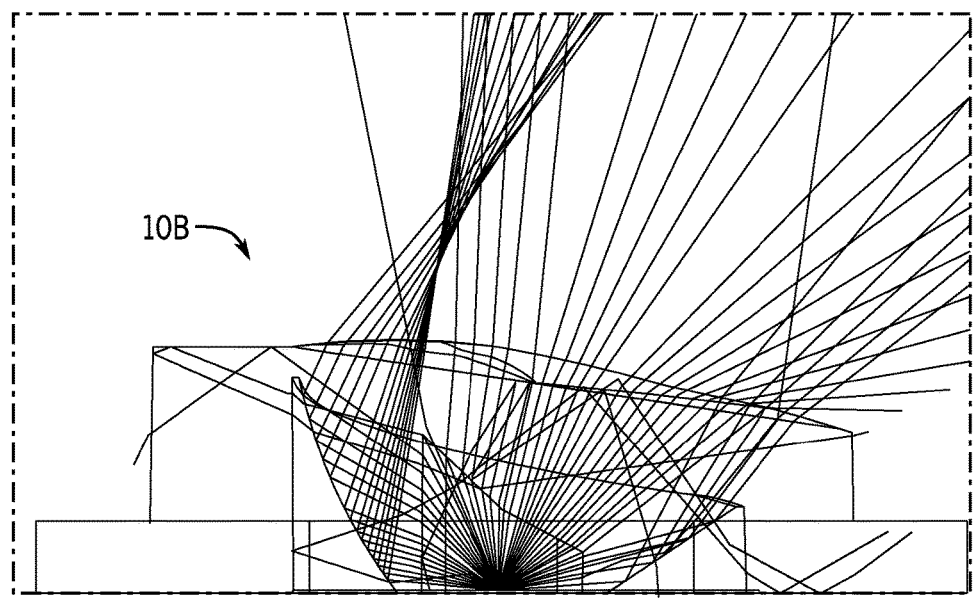
FIG. 28 is a side-to-side sectional view illustrating lateral aspects of the light distribution of the lens of FIG. 27.

FIGS. 27 and 28 illustrate lens 10B which has singularity point 66 offset from emitter axis 21 toward preferential side 2.

Figure 21:
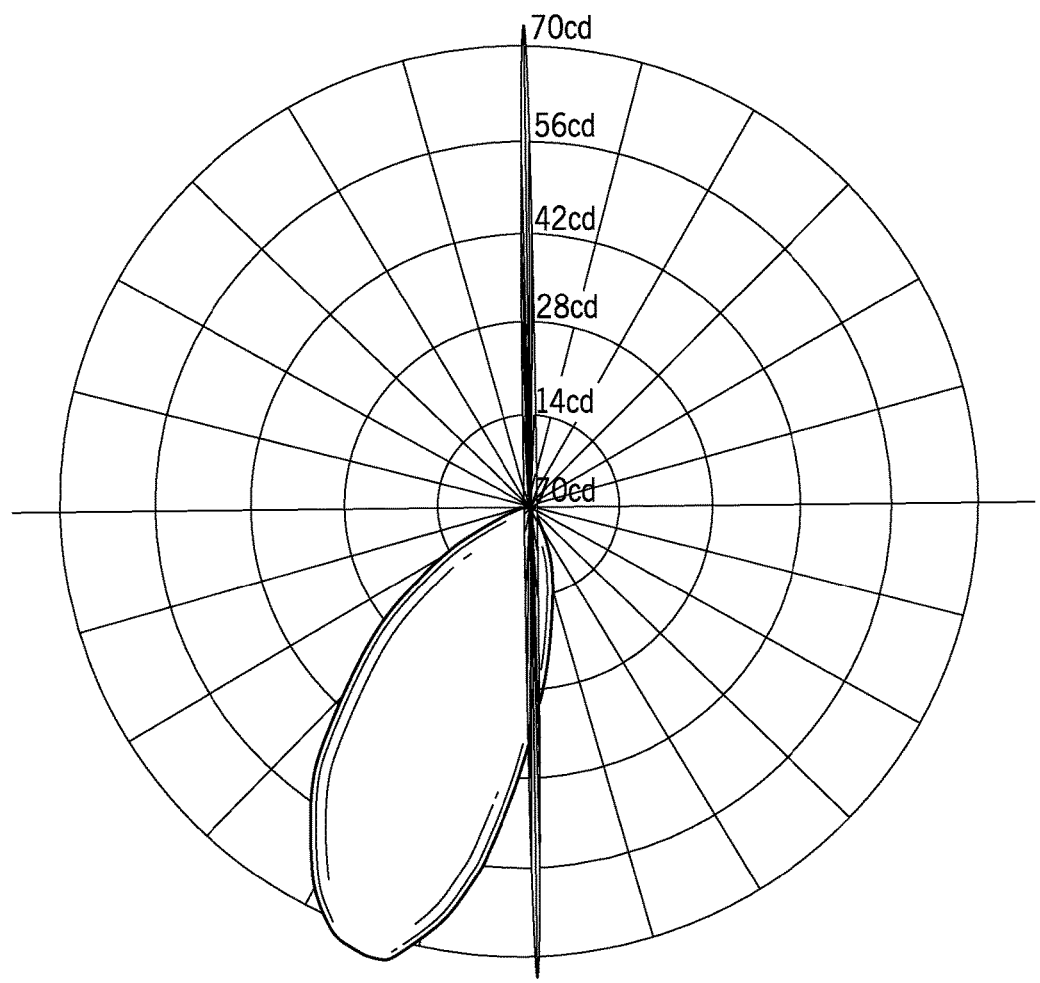
FIG. 21 is a side view of a three-dimensional polar intensity distribution by the inventive lens.
Figure 22:
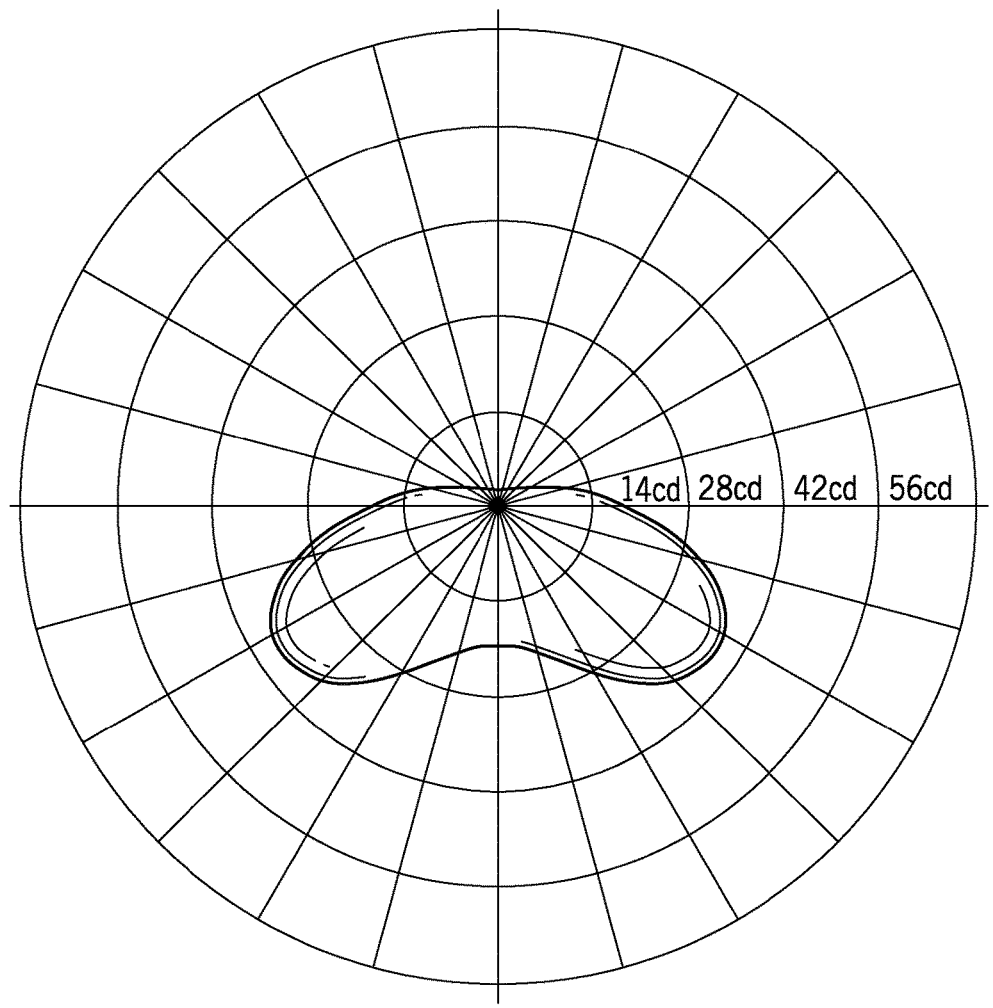
FIG. 22 is a top view of a three-dimensional polar intensity distribution by the inventive lens.
Figure 23:
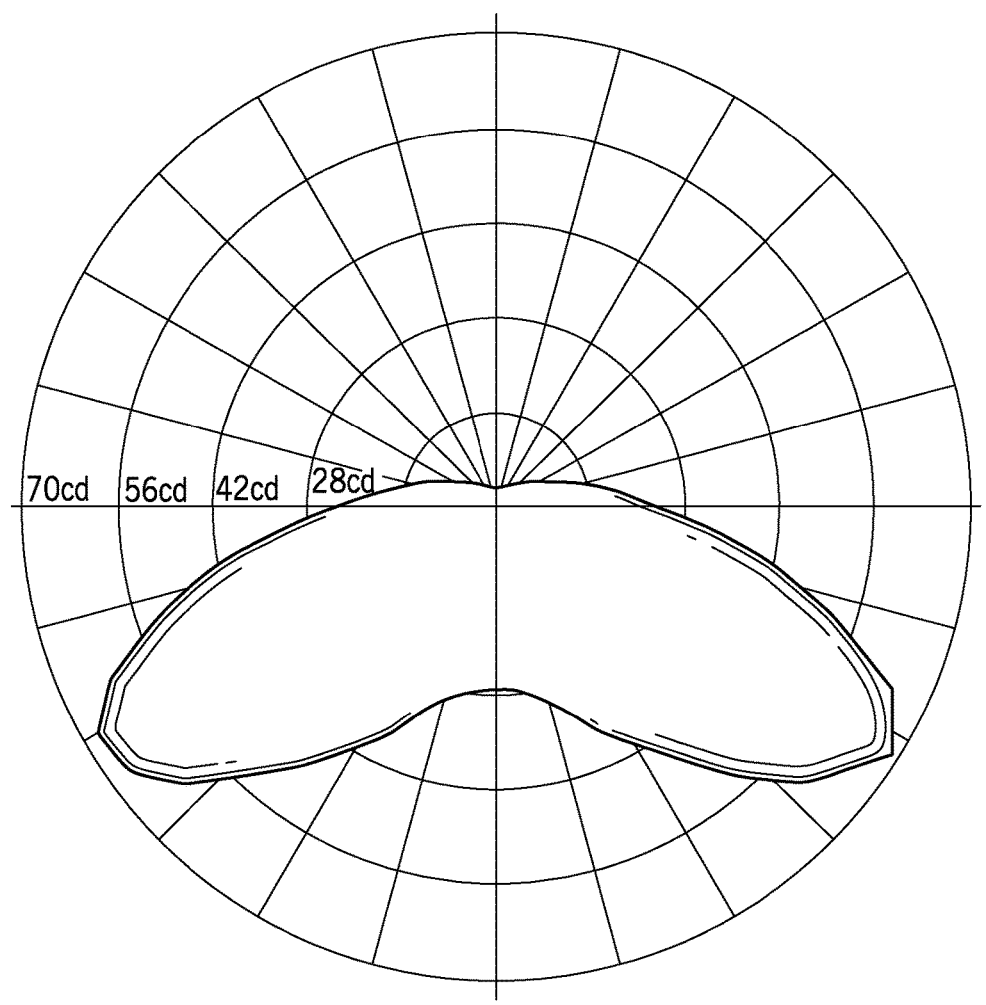
FIG. 23 is a bottom view of a three-dimensional polar intensity distribution by the inventive lens.
Figure 24:
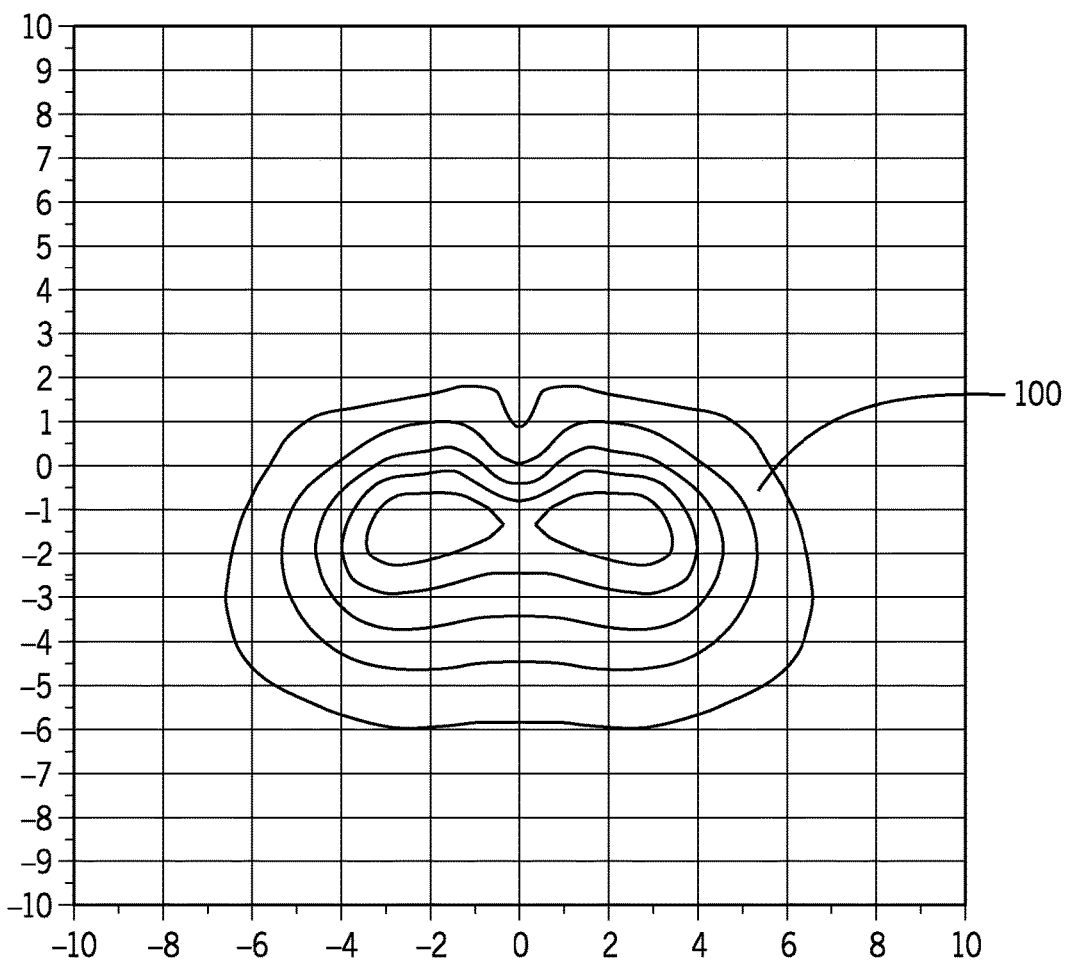
FIG. 24 is a two-dimensional ISO plot of illumination intensity distribution by the inventive lens on an illuminated surface substantially normal to the emitter axis.

FIGS. 21-24 illustrate preferential-side light distribution by inventive lens 10. FIG. 21 show an exemplary side view of a three-dimensional polar intensity distribution by inventive lens 10 illustrating minimizing back light with a desirable cut-off at a light pole location 18 with maximum forward illumination. FIG. 21 shows the main beam at 25° which is a desirable orientation for illumination of the automotive front line and minimal light directed beyond the front line. FIGS. 22 and 23 illustrate exemplary top and bottom views of the three-dimensional polar intensity distribution by inventive lens 10 and show a 60° lateral spread of light which creates an elongate illumination pattern 100, an example of which is illustrated in FIG. 24. Such elongate preferential-side illumination pattern 100 is desired for applications along the front line of automotive-sale parking lots or for illumination single-line streets.

FIGS. 1, 5-8 and 12-18 show lens 10 further including an outer surrounding wall 80 with an outer surrounding-wall surface 81 which extends from main output surface 60 toward base plane 110. FIGS. 3-7 illustrate outer surrounding-wall surface 81 as substantially cylindrical and substantially parallel to emitter axis 21. Outer surrounding-wall surface 81 is shown to have a right cylindrical shape of substantially circular cross-section taken in planes parallel to base plane 110. FIGS. 15-18 show an inner side 82 of outer surrounding wall 80 extending from reflecting surface 50 toward plane 110 substantially orthogonally to main plane 110. Inner side 82 is shown substantially cylindrical and having an elongate cross-section taken in planes parallel to base plane 110, as seen in FIGS. 4 and 11. Inner side 82 of outer surrounding wall 80 is shown elongate in the side-to-side direction such that an inner-side side-to-side dimension is greater than its front-to-back dimension which follows the configuration of reflecting surface 50.

It should be understood that many other configurations for the outer surrounding wall are possible, including without limitation surfaces generated by movement of a line which is other than straight. In some examples, outer surrounding-wall surface 81 may have various annular shapes, including shapes having different cross-sectional configurations at different positions therealong or may be angled with respect to the emitter axis.

An outward flange 15 is shown to extend from outer surrounding-wall surface 81 away from emitter axis 21. Flange 15 is shown as having an octagonal perimeter which facilitates mounting of the lens during light-fixture assembly. Flange 15 best shown in FIGS. 1, 2, 3 and 4 also has a lens-type-identifying marking 16 and a locator label 17 which references the lens location in an LED-array module. An orientation between marking 16 and label 17 indicates preferential side 2 of light distribution 100 shown in FIG. 24. These markings are preferably readable by robotic equipment for correct lens placement and orientation during light-fixture assembly. FIGS. 15 and 17 show flange 15 extending beyond base plane 11 with respect to emitter axis 21 in a direction opposite the light emission. FIGS. 16 and 18 show that such spacing allows positioning of plane 11 at the same level with the LED(s) of emitter 20 for most efficient capturing of emitter light.

It should be noted that inventive lens 10 has the configuration which is described above and which allows for molding of lens 10 in a single-piece mold. In other words, the lens configuration preferably permits easy removal of the lens from the mold without the need for separating the mold pieces as is the case with some lenses that require multiple-piece molds. The inventive lens can be simply pulled out of the mold.

FIGS. 29-34 show emitter 20 including at least one light-emitting diode (LED) 22. Light emitter 20 may include an LED package 23 which has a primary lens 24 over the at least one LED 22. In such embodiments, inventive lens 10 is a secondary lens placed over primary lens 24. Light emitter 20 may be of the type illustrated in FIGS. 31-33 which show LED package 23D with single LED 22 on a submount 26 and hemispheric primary lens 24D coaxially overmolded on submount 26 over LED 22.

Figure 29:
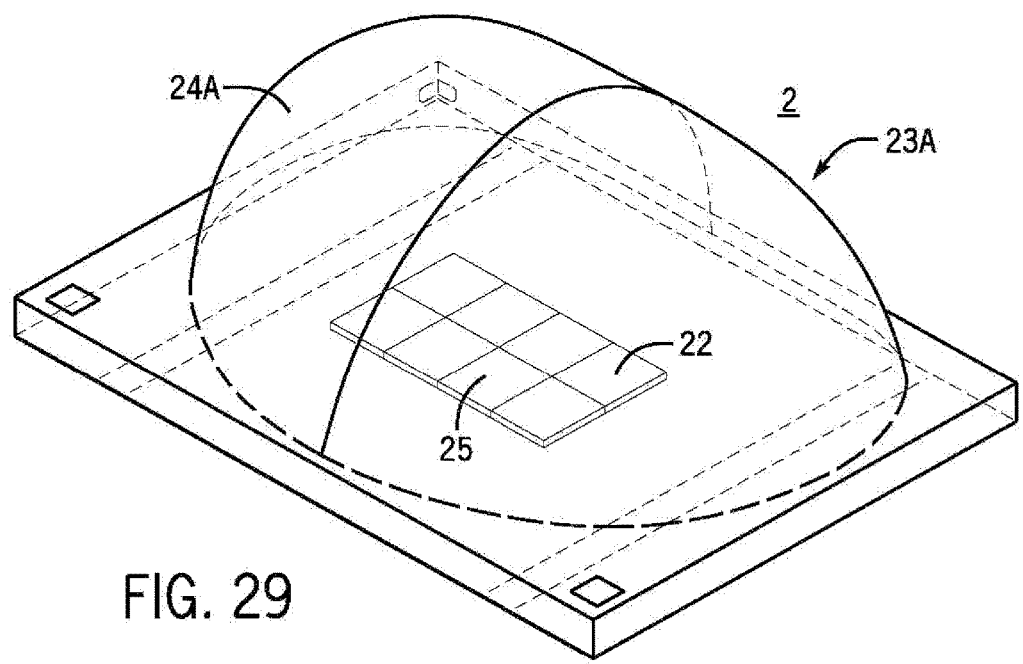
FIG. 29 is an enlarged perspective view of one example of an LED package and including an array of eight LEDs on a submount and an asymmetric primary lens overmolded over the LED array.
Figure 30:
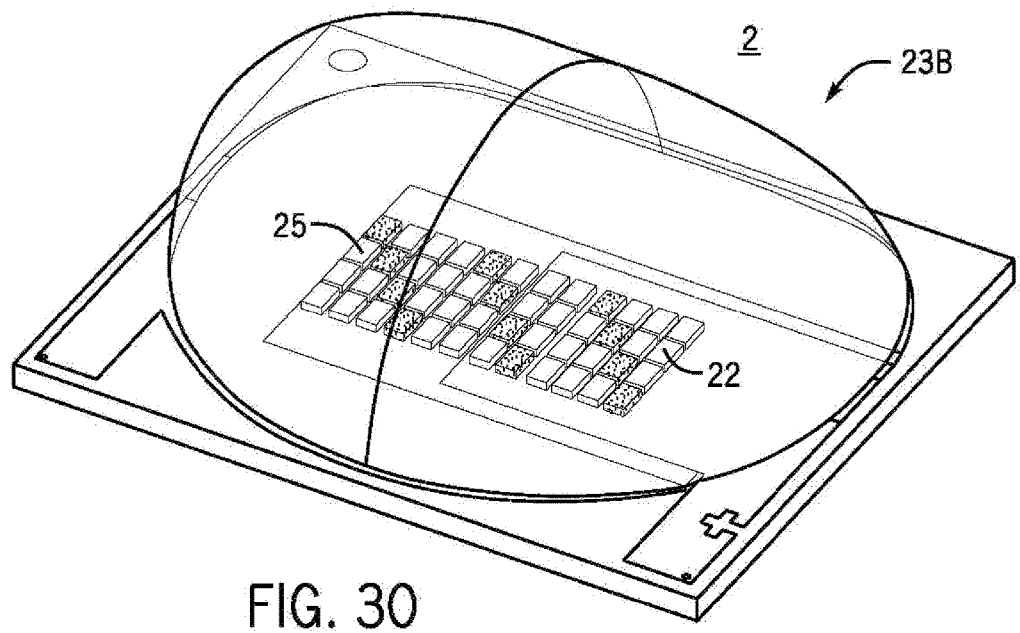
FIG. 30 is an enlarged perspective view of another example of an LED package and including an array of forty-eight LEDs on a submount and an asymmetric primary lens overmolded over the LED array.
Figure 31:
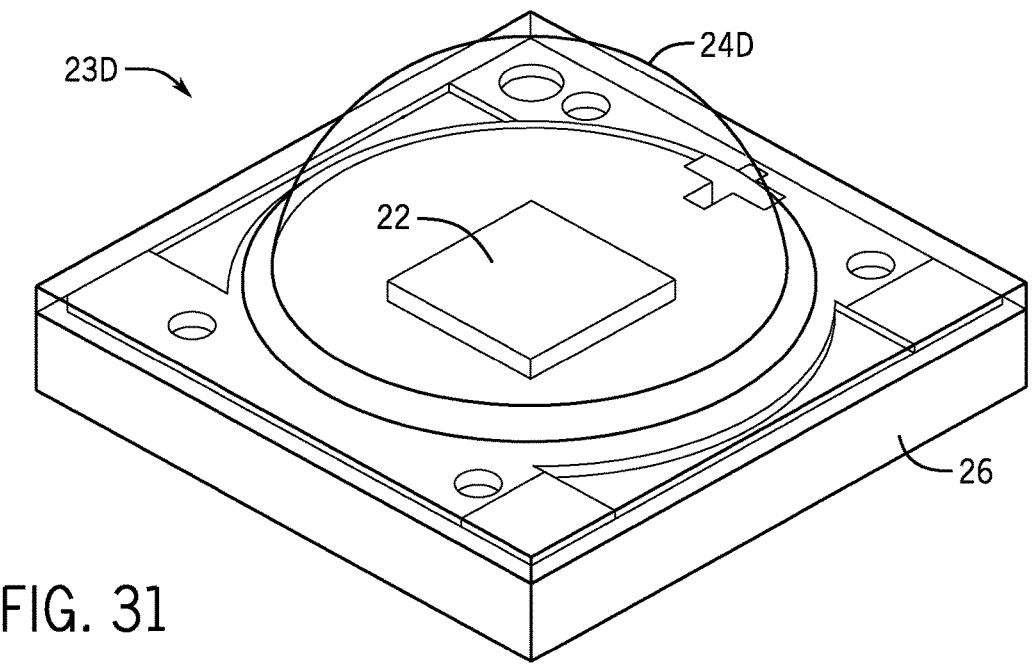
FIG. 31 is an enlarged perspective of yet another example of an LED package which has a single LED on a submount with a hemispheric primary lens overmolded over the LED.
Figure 32:
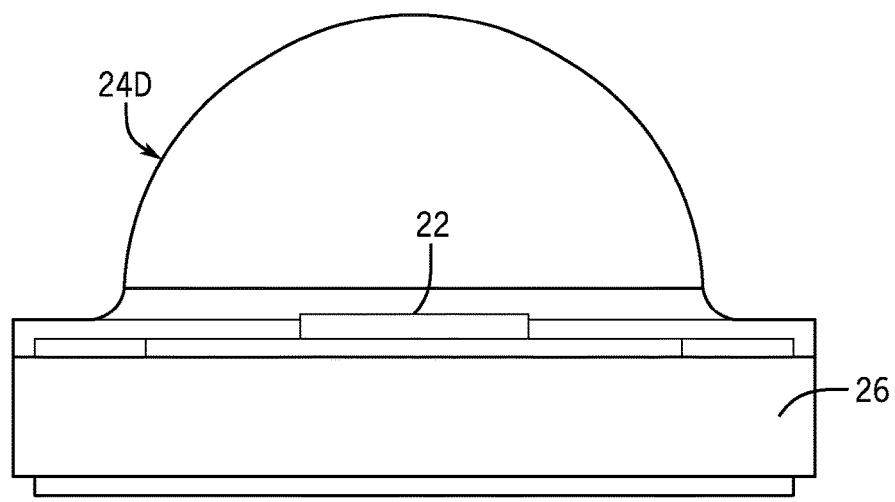
FIG. 32 is an enlarged side view of the LED package of FIG. 31.
Figure 33:
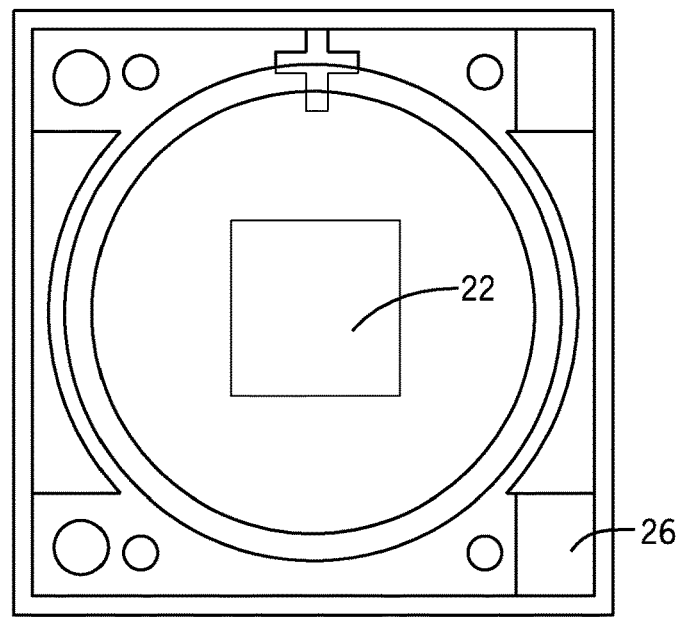
FIG. 33 is an enlarged top view of the LED package of FIG. 31.

FIGS. 29 and 30 illustrate exemplary LED packages 23A and 23B each including an array of LEDs 22 on an LED-populated area 25 which has an aspect ratio greater than 1, and primary lens 24 being overmolded on a submount 20 over LED-populated area 25. It is seen in FIG. 30 that the array may include LEDs 22 emitting different-wavelength light of different colors such as including red LEDs along with light green or other colors to achieve natural white light. Light emitters of the type as LED packages 23A and 23B are described in detail in application Ser. No. 13/441,558, filed on Apr. 6, 2012, and in application Ser. No. 13/441,620, filed on Apr. 6, 2012. Contents of both applications are incorporated herein by reference in their entirety.

Figure 34:
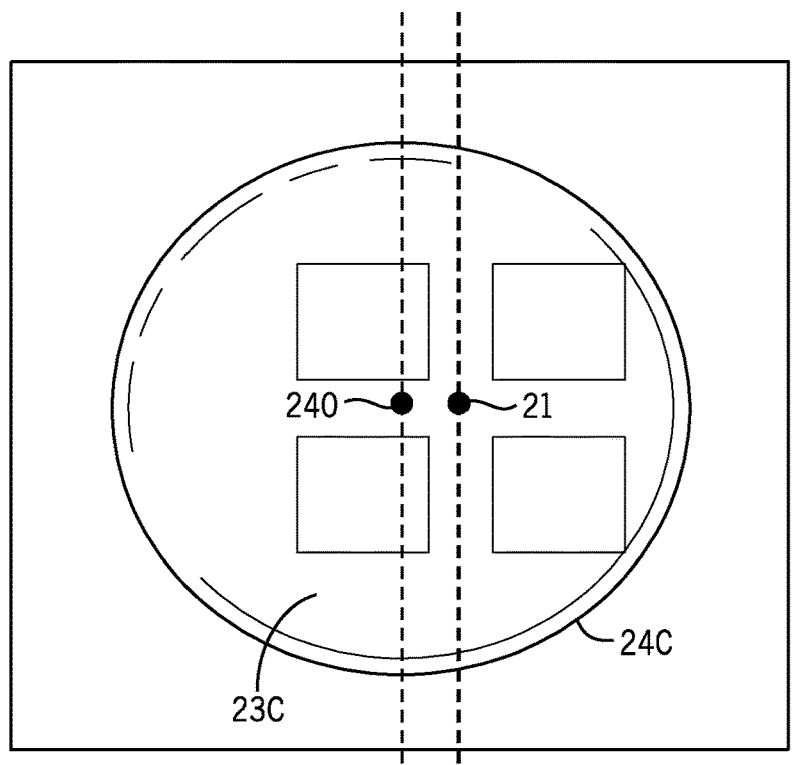
FIG. 34 is an enlarged top view of another exemplary LED package including an array of four LEDs on a submount and a hemispheric primary lens overmolded over the LED array such that the axis of the primary lens is offset from the axis of the LED array.

FIGS. 29, 30 and 34 illustrate versions of LED light emitter 20 configured to refract LED-emitted light toward a preferential direction 2. In each LED package 23A, 23B and 23C, each LED array defines emitter axis 21. FIGS. 29 and 30 illustrate primary lens 24A configured to refract LED-emitted light toward preferential side 2. FIG. 34 shows hemispheric primary lens 24C having a centerline 240 offset from emitter axis 21. It should be understood that for higher efficiency LED emitter 20 may have primary-lens having both its centerline offset from the emitter axis and also being shaped for refraction of LED-emitted light toward preferential side 2. In FIGS. 29 and 30, primary lens 24A is shown asymmetric.

In fixtures utilizing a plurality of emitters, a plurality of LEDs or LED arrays may be disposed directly on a common submount in spaced relationship between the LEDs or LED arrays each of which is overmolded with a respective primary lens. These types of LED emitters are sometimes referred to as chip-on-board LEDs. In such embodiments, a plurality of inventive lenses 10 are utilized with each lens 10 being positioned over a respective one of the primary lenses. The plurality of lenses 10 may be molded as a single piece which may have a single flange surrounding each of the plurality of lenses 10.

While the principles of this invention have been described in connection with specific embodiments, it should be understood clearly that these descriptions are made only by way of example and are not intended to limit the scope of the invention.

The invention claimed is:

1. A lens for distribution of light from a light emitter having an axis, the lens comprising a light-distribution wall having a base, a light-receiving inner surface and an outward surface, the light-distribution wall being configured for internal redirection of light entering the wall through the inner surface toward the outward surface for total internal reflection therefrom toward a main light-output surface which is transverse the axis, the base being bordered by inward and outward closed-perimeter edges each comprising at least four substantially straight edge portions joined by concave edge portions, the light-receiving inner surface defining an emitter cavity and extending from the base inward edge forming a closed-perimeter opening into the emitter cavity, the outward surface extending from the base outward edge toward the main light-output surface.

2. The lens of claim 1 wherein the light emitter includes at least one LED.

3. The lens of claim 2 wherein:
the light emitter includes an LED package having a primary lens over the at least one LED; and
the lens is a secondary lens placed over the primary lens.

4. The lens of claim 2 wherein at least about half of the cross-dimension of each side of the cavity opening is straight.

5. The lens of claim 4 wherein at least one pair of the at least four substantially straight edge portions of the base outward edge is substantially equidistantly spaced from the corresponding edge portions of the inward closed-perimeter edge.

6. The lens of claim 2 wherein the outward surface extends from the base away from the axis radially outwardly of and around the inner surface.

7. The lens of claim 6 wherein:
front and back sides of the base outward edge is longer than lateral sides of the base outward edge; and
the outward surface includes front and back curvatures, the front curvature having a front-curvature configuration which differs from the configuration of the back curvature.

8. The lens of claim 7 wherein the back curvature of the outward surface terminates at a greater distance from a plane defined by the base than the front curvature.

9. The lens of claim 2 wherein the main output surface includes front and back sectors, the front sector spanning greater than 180° about the emitter axis.

10. The lens of claim 9 wherein the main output surface is disposed at distances from a plane defined by the base which are greatest along the back of the back sector and gradually decrease toward the front of the front sector.

11. The lens of claim 10 wherein:
the main output surface has an edge including back-sector and front-sector portions;
a projection of the front-sector edge portion on the plane defined by the base extends along a circle; and
the back-sector edge portion is substantially linear and extends between the ends of the front-sector edge portion.

12. The lens of claim 11 wherein:
the main output surface includes a singularity point on a front-to-back plane which includes the emitter axis;
the front sector includes a convex curvature extending from the singularity point; and
the back sector includes a convex curvature extending from the singularity point, the back sector adjoining the front sector along planes each of which includes the singularity point and one of the ends of the front-sector edge portion.

13. The lens of claim 12 wherein the singularity point is offset from the emitter axis toward a preferential side.

14. The lens of claim 13 wherein the front and back sectors are each bilaterally symmetric along the front-to-back plane.

15. The lens of claim 2 wherein:
an outer surrounding-wall surface extends from the main output surface toward a plane defined by the base; and
an outward flange extends from the outer surrounding-wall surface away from the emitter axis.

16. The lens of claim 2 being bilaterally symmetric in a front-to-back direction.

17. A lens for preferential-side distribution of light from a light emitter having an axis, the lens comprising a light-distribution wall having a base, an inner surface and an outward surface, the light-distribution wall being configured for internal redirection of light entering the wall through the inner surface toward the outward surface for total internal reflection therefrom toward a main light-output surface which directs light toward the preferential side, the base being bordered by inward and outward closed-perimeter edges each comprising at least four substantially straight edge portions joined by concave edge portions, the inner surface defining an emitter cavity and extending from the base inward closed-perimeter edge forming a closed-perimeter opening into the emitter cavity, the outward surface extending from the base outward edge toward the main output surface and including front and back curvatures and a pair of substantially-identical lateral curvatures each adjoining the front and back curvatures, the front and back curvatures extending from longer sides of the base edge than do the lateral curvatures.

18. The lens of claim 17 wherein the light emitter includes at least one LED.

19. The lens of claim 18 wherein:
the light emitter includes an LED package having a primary lens over the at least one LED; and
the lens is a secondary lens placed over the primary lens.

20. The lens of claim 18 wherein:
the cavity opening is substantially square;
at least one pair of the at least four substantially straight edge portions of the base outward edge being substantially equidistantly spaced from the corresponding edge portions of the inward closed-perimeter edge; and
a lateral spacing of the base edge from the cavity opening being greater than spacings forwardly and rearwardly.

21. The lens of claim 20 wherein:
the opening is in a base plane substantially normal to the axis; and
the back curvature terminates at greater distances from the base plane than the front curvature.

22. The lens of claim 21 wherein the front and back curvatures are each bilaterally symmetric.

23. The lens of claim 18 wherein the front and back curvatures are each bilaterally symmetric.

24. The lens of claim 18 being bilaterally symmetric in a front-to-back direction.

25. A lens for a distribution of light from an LED light emitter having an axis, the lens comprising a light-distribution wall having a base, a light-receiving inner surface and an outward surface, the light-distribution being configured for internal redirection of light entering the wall through the inner surface toward the outward surface for total internal reflection therefrom toward a main output surface which is transverse the axis and directs light toward the preferential side, the base being bordered by inward and outward closed-perimeter edges each comprising at least two pairs of substantially straight edgeportions joined by concave edge portions, the substantially straight edge portions of one pair of at least one of the edges being longer than the substantially straight edge portions of another pair of such at least one of the edges, the light-receiving inner surface defining an emitter cavity and extending from the base inward closed-perimeter edge which forms a closed-perimeter opening into the emitter cavity, the outward surface extending from the base outward closed-perimeter edge toward the main output surface.

26. The lens of claim 25 wherein the inner surface includes a surrounding inner surface extending from the opening and terminating at an inner end surface.

27. The lens of claim 26 wherein the surrounding inner surface extends from the opening substantially parallel to the emitter axis.

28. The lens of claim 27 wherein the inner end surface extends between front and back edges, the back edge being farther from the base plane than the front edge.

29. The lens of claim 28 wherein the inner end surface includes front and back facets angled with respect to one another and each extending from the respective one of the front and back edges to a centrally-located side-to-side juncture.

30. The lens of claim 29 wherein the inner end surface includes a pair of each of the front and back facets, the facets of each pair being adjoined along a centrally-located front-to-back juncture and extending from the front-to-back juncture toward the base.

31. The lens of claim 30 wherein the front and back facets are substantially planar.

32. The lens of claim 25 wherein the light-output surface has at least one substantially planar refracting portion transverse the axis.

33. The lens of claim 25 wherein at least about half of the cross-dimension of the edge portions of the cavity opening is straight.

34. The lens of claim 33 wherein at least about two-thirds of the cross-dimension of each side of the cavity opening is straight.

35. The lens of claim 25 wherein the inner surface includes a surrounding inner surface extending from the opening substantially parallel to the emitter axis.

36. The lens of claim 6 wherein the inner end surface is substantially planar and substantially normal to the emitter axis and to the inner surrounding surface.

37. The lens of claim 32 wherein the at least one substantially planar refracting portion of the light-output surface is substantially normal to the emitter axis.

38. The lens of claim 32 wherein a front-to-back dimension of the light-output surface is greater than a side-to-side dimension of the light-output surface.

39. The lens of claim 38 wherein the light-output surface has a pair of convex front and back edges each extending between a pair of substantially-straight lateral edges.

40. The lens of claim 39 wherein:
the front and back edges extend along sectors of a circle with a center on the emitter axis; and
the lateral edges are substantially parallel to each other.

41. The lens of claim 39 further comprising a pair of refracting lateral output surfaces each extending from one of the lateral edges of the light-output surface toward a base plane defined by the base, each of the lateral output surfaces being substantially planar.

42. The lens of claim 41 wherein the inner surrounding surface includes:
front and back portions refracting forward and rearward emitter light away from the axis; and
a pair of lateral portions each between the front and back portions and refracting lateral emitter light away from the emitter axis.

43. The lens of claim 25 wherein the inner end surface and portions of the inner surrounding surface are substantially planar.

* * * * *

UNITED STATES PATENT AND TRADEMARK OFFICE
CERTIFICATE OF CORRECTION

Page 1 of 1

PATENT NO. : 10,408,429 B2
APPLICATION NO. : 13/466076
DATED : September 10, 2019
INVENTOR(S) : Mario Alberto Castillo It is certified that error appears in the above-identified patent and that said Letters Patent is hereby corrected as shown below:

In the Claims

At Column 12, Line 10, delete "claim 6" and insert --claim 26--.

Signed and Sealed this
Seventh Day of April, 2020

Andrei Iancu
*Director of the United States Patent and Trademark Office*